(12) United States Patent
Hu

(10) Patent No.: US 11,484,865 B2
(45) Date of Patent: Nov. 1, 2022

(54) HYDROGEN PEROXIDE SELECTIVE CATALYSTS, METHODS OF USING THEREOF, AND METHODS OF MAKING THEREOF

(71) Applicant: Yale University, New Haven, CT (US)

(72) Inventor: Shu Hu, New Haven, CT (US)

(73) Assignee: YALE UNIVERSITY, New Haven, CT (US)

( * ) Notice: Subject to any disclaimer, the term of this patent is extended or adjusted under 35 U.S.C. 154(b) by 259 days.

(21) Appl. No.: 16/867,267

(22) Filed: May 5, 2020

(65) Prior Publication Data

US 2020/0353448 A1 Nov. 12, 2020

Related U.S. Application Data

(60) Provisional application No. 62/843,856, filed on May 6, 2019.

(51) Int. Cl.
| | | |
|---|---|---|
| *B01J 23/755* | (2006.01) | |
| *C01B 15/029* | (2006.01) | |
| *C25B 1/30* | (2006.01) | |
| *B01J 37/02* | (2006.01) | |
| *B01J 37/08* | (2006.01) | |
| *B01J 35/02* | (2006.01) | |
| *C25B 9/17* | (2021.01) | |

(52) U.S. Cl.
CPC .............. *B01J 23/755* (2013.01); *B01J 35/02* (2013.01); *B01J 37/0215* (2013.01); *B01J 37/08* (2013.01); *C01B 15/0295* (2013.01); *C25B 1/30* (2013.01); *C25B 9/17* (2021.01)

(58) Field of Classification Search
CPC ...... B01J 23/755; B01J 35/02; B01J 37/0215; B01J 37/08; C01B 15/027; C01B 15/029; C01B 15/0295; C25B 1/30
USPC .......................... 502/337; 423/584; 204/175
See application file for complete search history.

(56) References Cited

U.S. PATENT DOCUMENTS

| | | | | |
|---|---|---|---|---|
| 3,846,273 | A * | 11/1974 | Bianchi ................. | C25B 11/093 427/126.3 |
| 4,072,585 | A * | 2/1978 | Bianchi ..................... | C25B 1/46 205/535 |
| 5,480,629 | A * | 1/1996 | Thompson ........... | B01J 31/1691 423/584 |
| 5,512,263 | A * | 4/1996 | McIntyre ............... | B01J 35/065 423/584 |
| 10,003,089 | B2 * | 6/2018 | Ricketts ................ | H01M 8/026 |
| 2005/0163701 | A1 * | 7/2005 | Tonkovich ........... | B01J 19/0093 423/584 |

(Continued)

OTHER PUBLICATIONS

Fuku, et al., "WO3/BiVO4 photoanode coated with mesoporous Al2O3 layer for oxidative production of hydrogen peroxide from water with high selectivity", RSC Advances, 7(75):47619-47623 (2017).

(Continued)

*Primary Examiner* — Patricia L. Hailey
(74) *Attorney, Agent, or Firm* — Pabst Patent Group LLP

(57) ABSTRACT

Catalysts for selective production of hydrogen peroxide and methods of making and using thereof have been developed. The catalysts include an alloyed or doped metal oxide which permits tuning of the catalytic properties of the catalysts for selection of a desired pathway to a product, such as hydrogen peroxide. The catalysts may be incorporated into electrochemical or photochemical devices.

25 Claims, 7 Drawing Sheets

(56) References Cited

U.S. PATENT DOCUMENTS

| | | | | |
|---|---|---|---|---|
| 2009/0074611 | A1* | 3/2009 | Monzyk | A61L 2/02 422/187 |
| 2012/0051999 | A1* | 3/2012 | Chung | C01B 15/029 977/773 |
| 2018/0287169 | A1* | 10/2018 | Yagyu | H01M 8/0228 |
| 2019/0379057 | A1* | 12/2019 | Song | H01M 4/9058 |

OTHER PUBLICATIONS

Hill, et al., "Effect of Electrolytes on the Selectivity and Stability of n-type WO3 Photoelectrodes for Use in Solar Water Oxidation", The Journal of Physical Chemistry C, 116:7612-7620 (2012).

Izgorodin, et al., "Low overpotential water oxidation to hydrogen peroxide on a MnOx catalyst", Energ. Environ. Sci., 5:9496-9501 (2012).

Ki, et al., "H2O2 Production in Microbial Electrochemical Cells Fed with Primary Sludge", Environmental Science & Technology, 51(11):6139-6145 (2017).

Shi, et al., "Understanding activity trends in electrochemical water oxidation to form hydrogen peroxide", Nat. Commun. 8(701):1-6 (2017).

Shi, et al., "Light☐Driven BiVO4-C Fuel Cell with Simultaneous Production of H2O2", Adv. Energy Mater., 8(23):1801158 (2018).

Siahrostami, et al., "One- or Two-electron Water Oxidation, Hydroxyl Radical or H2O2 Evolution", The Journal of Physical Chemistry Letters, 8:1157-1160 (2017).

Siddiqi, et al., "Stable water oxidation in acid using manganese-modified TiO2 protective coatings", ACS Applied Materials & Interfaces, 10(22):18805-18815 (2018).

Umebayashi, et al., "Analysis of electronic structures of 3d transition metal-doped TiO2 based on band calculations", J. Phys. Chem. Solids, 63:1909-1920 (2002).

* cited by examiner

HYDROGEN PEROXIDE SELECTIVE CATALYSTS, METHODS OF USING THEREOF, AND METHODS OF MAKING THEREOF

CROSS-REFERENCE TO RELATED APPLICATIONS

This application claims the benefit of and priority to U.S. Provisional Application No. 62/843,856 filed May 6, 2019, which is incorporated herein by reference in its entirety.

FIELD OF THE INVENTION

This invention is in the field of catalysts, such as electrocatalysts, which are tunable and can be selective catalysts in water oxidation pathways.

BACKGROUND OF THE INVENTION

Hydrogen peroxide ($H_2O_2$) is a commercially important oxidant which has various chemical and environmental applications, such as pulp bleaching chemical-mechanical actuation, and wastewater treatment.

Currently, hydrogen peroxide is produced using the anthraquinone oxidation process (Campos-Martin, J. M., Blanco-Brieva, G. & Fierro, J. L. G. Hydrogen Peroxide Synthesis: An Outlook beyond the Anthraquinone Process. *Angewandte Chemie International Edition* 45, 6962-6984, (2006); and Goor, G. & Kunkel, W. (VCH Weinheim, 1989)) due to high selectivity for hydrogen peroxide in this process. However, the anthraquinone oxidation process is a complex process that involves sequential hydrogenation and oxidation steps and is thereby prone to both mass-transport limitation and energy-demanding purification process (Id.).

A direct electrochemical production pathway for hydrogen peroxide via water oxidation reaction could provide an attractive alternative because it allows for the use of abundant water and oxygen in the air as the principal reactants. However, selective water oxidation to produce hydrogen peroxide over heterogeneous surfaces, under electrocatalytic conditions, has exhibited very low Faradaic efficiencies (FE) due to the competitive reactions of $O_2$ evolution and/or OH radical (OH.) formation.

Accordingly, there is a challenge for selective $2e^-$ water oxidation into hydrogen peroxide and for finding suitable catalysts which avoid other pathways, such as $O_2$ evolution and/or OH radical (OH.) formation. This is a known issue of reported water oxidation catalysts, such as $Fe_2O_3$, $IrO_x$, which are not selective for the production of hydrogen peroxide. Other issues of concern exist in that as-produced hydrogen peroxide can be oxidized to 02 at excess overpotentials or undergo chemical disproportionation to water and oxygen at the anode of an electrochemical cell.

Therefore, there is a need for a catalytic process and for catalysts that can selectively produce one desirable product over another, such as hydrogen peroxide. This process may address the conundrum of electrochemical reaction selectivity, even the desired product exhibit less driving force to produce than the undesired product.

There also is a need for methods of preparing such selective catalysts and methods of using the same where the issue of hydrogen peroxide stability is addressed.

Therefore, it is an object of the invention to provide selective catalysts that is selective for one product versus another.

It is also an object of the invention to provide selective catalysts that catalyze the oxidation of water to form hydrogen peroxide by electrical energy input.

It is also an object of the invention to provide methods for preparing such selective catalysts.

It is a further object of the invention to provide methods of using the selective catalysts described.

SUMMARY OF THE INVENTION

Catalysts for selective production of hydrogen peroxide and methods of making and using thereof have been developed. The catalysts include an alloyed or doped metal oxide which permits tuning of the catalytic properties of the catalysts for selection of a desired pathway to a product, such as hydrogen peroxide. The catalysts may be incorporated into electrochemical or photochemical devices.

The layered peroxide selective catalyst comprises:

(1) at least a first layer on a substrate wherein the at least first layer comprises at least a first metal oxide alloyed or doped with at least one metal selected from the group consisting of manganese, chromium, vanadium, cobalt, oxides thereof, and combinations thereof; and (2) at least a second layer wherein the second layer comprises at least a second metal oxide which is optionally free or substantially free of the least one metal selected from the group consisting of manganese, chromium, vanadium, cobalt, nickel oxides thereof, and combinations thereof.

(3) where the layers are repeated to reach a desirable thickness of catalyst films.

In one embodiment the first and/or the second layers are formed by atomic layer deposition (ALD) and/or by sputtering. In another, the catalyst is annealed in air or under an inert atmosphere at a temperature ranging from between about 300 to 700° C., 300 to 600° C., or 300 to 500° C. and for a period of time ranging from between about 0.1 to 3 hours, 0.1 to 2 hours, or 0.1 to 1 hours. The first or the second metal oxide can be formed of a metal oxide selected from a titanium dioxide, a tin oxide, a tungsten oxide, or a combination thereof. Examples of metal oxides include manganese(II) oxide, manganese(II,III) oxide, manganese (III) oxide, manganese(IV) oxide, manganese(VI) oxide, manganese(VII) oxide, chromium(II) oxide, chromium(III) oxide, chromium(IV) oxide, chromium(VI) oxide), chromium(VI) oxide peroxide, vanadium(II) oxide, vanadium(III) oxide, vanadium(IV) oxide, vanadium(V) oxide, cobalt(II) oxide, cobalt(III) oxide, cobalt(II,III) oxide, nickel (I) oxide, nickel (II) oxide, nickel (III) oxide, nickel(II, III) oxide, nickel (IV) oxide, and combinations thereof.

The second layer is free or substantially free of the least one metal selected from the group consisting of manganese, chromium, vanadium, and cobalt.

In one embodiment, the atomic percentage of the at least one metal doped or alloyed in the at least first metal oxide is in the range of between about 1 and 75%, 1 and 70%, 1 and 60%, 1 and 50%, 10 and 50%, 20 and 50%, 30 and 50% of the first layer alone or in combination with the second layer.

The metal oxide of the first layer is alloyed or doped with a metal selected from the group consisting of manganese, chromium, vanadium, cobalt, and can be defined according to Formula (1) or Formula (2):

$$M^1[(M^2_y)O_x] \qquad (1)$$

$$M^1[(M^2)O_x]_y \qquad (2)$$

where $M^1$ is selected from the group consisting of manganese, chromium, vanadium, cobalt, and combinations thereof; $M^2$ is selected from the group consisting of titanium, tin, tungsten, and combinations thereof; and y is a composition value which is a >0 real number, such as a value from 0-3, 0-2, 1-3, or 1-2, and x is a composition value which is a >0 real number, such as a value from 0-3, 0-2, or 1-2, 1-3. In some cases, x and y are each integer values of the specified ranges. In some instances, $(M^2)O_x$ of Formula (2) is a stoichiometric oxide.

The catalyst may be in the form or particles or on a conductive substrate, a photocatalytic substrate, or a combination thereof. For example, the substrate can be a tin-doped indium oxide (ITO) substrate, fluorine doped tin oxide (FTO) substrate, or a carbon-based substrate. In representative embodiments, the first layer and/or the second layer independently have a thickness selected from the range of about 1-100 nm, 5-100 nm, 5-90 nm, 5-80 nm, 5-70 nm, 5-60 nm, 5-70 nm, 5-60 nm, 5-50 nm, 5-40 nm, 5-30 nm, 5-25 nm, 5-20 nm, and 5-10 nm.

The catalyst may be selective for a two-electron oxidation of water for producing hydrogen peroxide with Faradaic efficiencies of greater than about 50, 55, 60, 65, 70, 75, 80, 81, 82, 83, 84, 85, 86, 87, 88, 89, 90, 91, 92, 93, 94, 95, 96, 97, 98, or 99%.

Catalyst particles may be formed of (1) a core containing at least a metal oxide alloyed or doped with at least one metal selected from the group consisting of manganese, chromium, vanadium, cobalt, oxides thereof, and combinations thereof; and (2) an outer-shell containing at least a second metal oxide which is optionally free or substantially free of the least one metal selected from the group consisting of manganese, chromium, vanadium, cobalt, oxides thereof, and combinations thereof. The particle may be annealed in air or under an inert atmosphere at a temperature ranging from between about 300 to 700° C., 300 to 600° C., or 300 to 500° C. and for a period of time ranging from between about 0.1 to 3 hours, 0.1 to 2 hours, or 0.1 to 1 hours.

The catalysts may be made using a method comprising the steps of:

(1) depositing at least a first layer on a substrate by atomic layer deposition and/or by sputtering at a predetermined deposition temperature, wherein the at least first layer comprises at least a first metal oxide alloyed or doped with at least one metal selected from the group consisting of manganese, chromium, vanadium, cobalt, oxides thereof, and combinations thereof;

(2) depositing at least a second layer by atomic layer deposition and/or by sputtering at a predetermined temperature on the at least first layer;

wherein the second layer comprises at least a second metal oxide which is optionally free or substantially free of the least one metal selected from the group consisting of manganese, chromium, vanadium, cobalt, oxides thereof, and combinations thereof; and (3) annealing the resulting layered peroxide selective catalyst.

The annealing step may be carried out in air or under an inert atmosphere at a temperature ranging from between about 300 to 700° C., 300 to 600° C., or 300 to 500° C. and for a period of time ranging from between about 0.1 to 3 hours, 0.1 to 2 hours, or 0.1 to 1 hours. In some instances, steps (1) and (2) may be optionally repeated to grow multi-layer structures to the desirable thickness for the peroxide selective catalyst, before the (3) annealing step.

The catalyst may be an electrocatalyst or a photocatalyst. The atomic layer deposition in steps (1) and/or (2) can be carried out using a metal-containing precursor containing of titanium, tin, or tungsten. In one embodiment the at least one metal of step (1) is deposited by atomic layer deposition using a metal-containing precursor containing of manganese, chromium, vanadium, cobalt and nickel. The atomic layer deposition can comprise a second precursor or co-reactant which is water vapor.

The catalyst or catalyst particle may be used in an electrochemical device comprising an anode, a cathode, and an aqueous medium, such as an electrolyzer or a photochemical device. The device may be used to catalyze oxidation of water to hydrogen peroxide as the only or substantially the only product of the oxidation of the water. The catalyst or catalyst particle may be used in an electrode, such as an anode, photoanode, cathode, or gas diffusion cathode.

In a preferred embodiment the catalyst is used in a method of oxidizing water to selectively form hydrogen peroxide, by contacting the catalyst or catalyst particle with water or an aqueous solution; and applying an effective amount of a stimulus to drive oxidation of the water or to drive oxidation of the water in the aqueous solution to form hydrogen peroxide as the only or substantially the only product of the oxidation of the water, wherein the stimulus can be an electrochemical potential or electromagnetic radiation, such as light, or carried out in an electrochemical device or photochemical device.

Figure 5A:
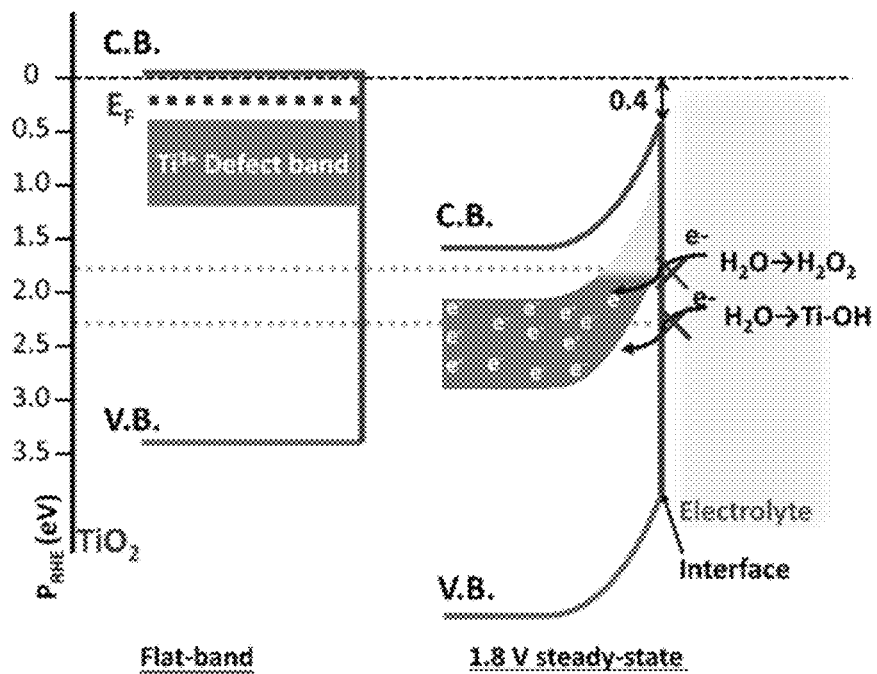

FIG. 5A shows a representation of the band energetics under anodic potential (during water oxidation) for a "leaky" TiO₂ thin film. The left diagram is drawn under flat band conditions and the right diagram shows that the electrode was poised at an anodic potential of +1.8 V$_{RHE}$ (the corresponding overpotential is 24 mV). This potential thermodynamically allows for the formation of surface-bound hydroxyl intermediates.

Figure 5B:
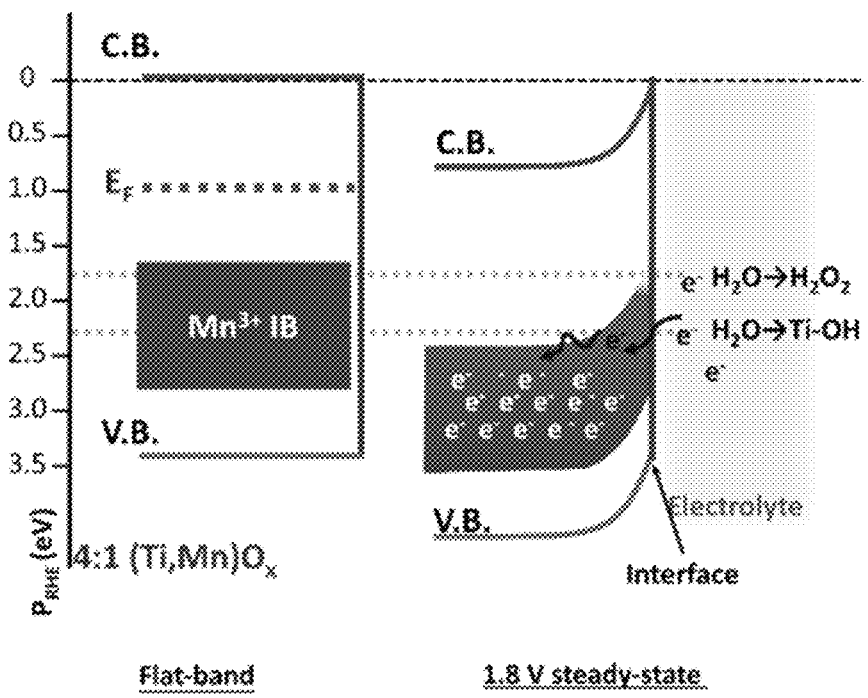

FIG. 5B shows a representation of the band energetics under anodic potential (during water oxidation) for a 4:1 (Ti,Mn)O$_x$ thin film. The left diagram is drawn under flat band conditions and the right diagram shows that the electrode was poised at an anodic potential of +1.8 V$_{RHE}$ (the corresponding overpotential is 24 mV). This potential thermodynamically allows for the formation of surface-bound hydroxyl intermediates.

Figure 6:
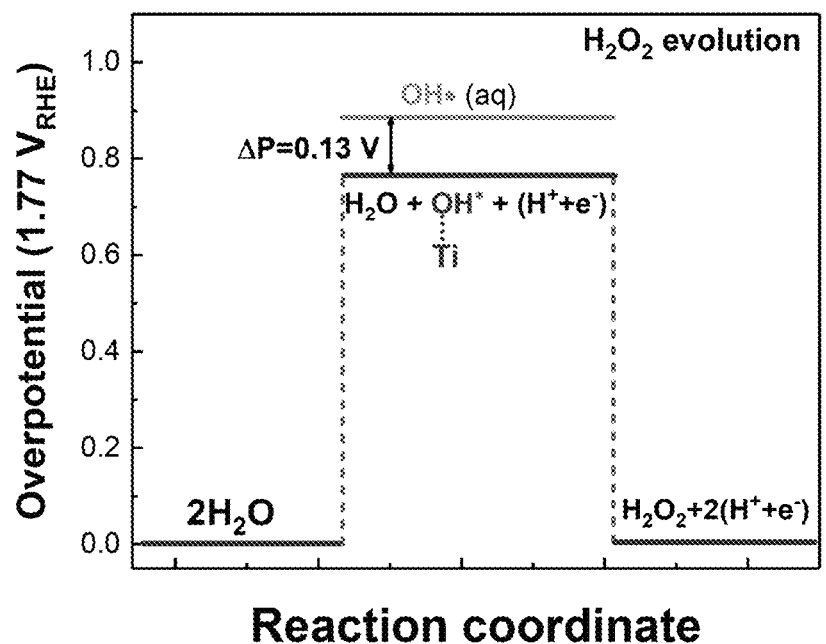

FIG. 6 shows a representation of a free energy diagram for the water oxidation reaction process on a (Ti,Mn)O$_x$ surface plotted at a zero overpotential.

Figure 7:
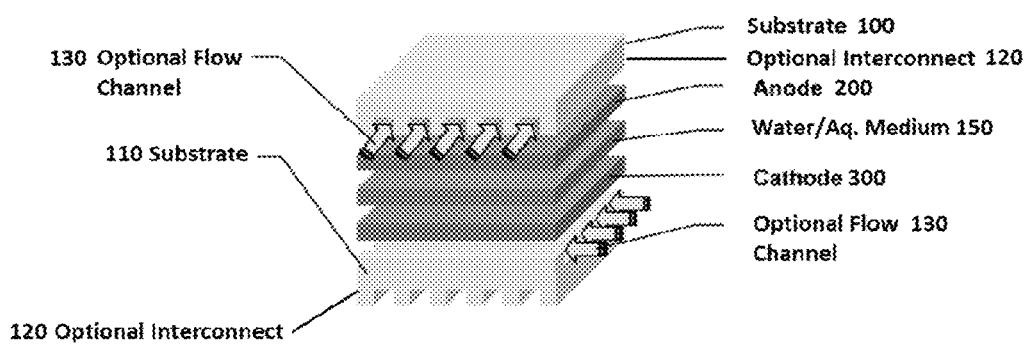

FIG. 7 is a non-limiting illustration of a device which is a cell containing an anode (200), a cathode (300) each on suitable substrates (100 or 110), a water/aqueous medium (150), and optional flow channels (130). The device may be an electrochemical device or a photochemical device.

DETAILED DESCRIPTION OF THE INVENTION

I. Definitions

"Water oxidation catalyst" or "WOC" are used interchangeably and refer to a catalyst capable of oxidizing water to selectively form hydrogen peroxide (H₂O₂) through a 2-electron (2e⁻) reaction according, as an example, to the following reaction:

$$2H_2O \rightarrow H_2O_2 + 2(H^+ + e^-)$$

"Heterogeneous", as used herein, refers to a form of catalysis where the phase of the catalyst differs from that of the reactants.

"Homogeneous", as used herein, refers to a catalyst which is soluble (i.e., same phase as the reactants) in a reaction solution.

"Electrocatalyst", as used herein, refers to a catalyst capable of accelerating electrochemical reactions in the presence of the catalyst and under electrical energy input.

"Photocatalyst", as used herein, refers to refers to a catalyst capable of accelerating photochemical reactions in the presence of the catalyst and under light energy input.

"Oxidatively stable" as used herein, means that more than 90%, more than 92%, more than 94%, more than 95%, more than 98%, more than 99%, more than 99.5%, more than 99.9%, more than 99.95%, more than 99.99% of the catalyst remain active or operational in the presence of one or more reactants and applied potentials, over a broad pH range (e.g., 1-12) for at least 7 days, 14 days, 21, days, 28 days, 30 days, 45 days, two months, three months, four months, five months, six months, one year, or longer at ambient temperature and ambient light conditions. Alternatively, the catalyst undergoes less than 10%, less than 5%, less than 1%, less than 0.5%, less than 0.1%, less than 0.05%, or less than 0.01% degradation under the conditions described above.

"Hydrolytically stable", as used herein, means that more than 90%, more than 92%, more than 94%, more than 95%, more than 98%, more than 99%, more than 99.5%, more than 99.9%, more than 99.95%, more than 99.99% of the catalyst is intact in the presence of water over a broad pH range (e.g., 3-9) for at least 7 days, 14 days, 21, days, 28 days, 30 days, 45 days, two months, three months, four months, five months, six months, one year, or longer at ambient temperature and ambient light conditions. Alternatively, the catalyst undergoes less than 10%, less than 5%, less than 1%, less than 0.5%, less than 0.1%, less than 0.05%, or less than 0.01% hydrolysis under the conditions described above.

"Thermally stable", as used herein, means that more than 90%, more than 92%, more than 94%, more than 95%, more than 98%, more than 99%, more than 99.5%, more than 99.9%, more than 99.95%, more than 99.99% of the catalyst is structurally intact at room temperature or lower or when heated to a temperature above room temperature.

"Turn-over number" or "TON", as used herein, means the number of moles of substrate that a mole of catalyst converts in the timeframe of the experiment or before being deactivated.

"Turn-over frequency" or "TOF", as used herein, refers to the turnover per unit time under turnover conditions. It is typically expressed in s⁻¹. The TOF can be calculated by dividing the TON by the time period, in seconds, over which the TON was measured.

"Turn-over conditions", as used herein, refers to the conditions in which the catalytic reaction takes place. "Turn-over conditions" typically include pH and temperature, concentration of the oxidant or the electrochemical potential applied, and concentration of the WOC. The turnover conditions and thus TONs and TOFs can vary for a given WOC.

Numerical ranges disclosed in the present application include, but are not limited to, ranges of temperatures, ranges of times, ranges of current densities, ranges of pH, ranges of overpotentials, ranges of Faradaic efficiencies, ranges of integers, and ranges of thicknesses, amongst others. The disclosed ranges, disclose individually each possible number that such a range could reasonably encompass, as well as any sub-ranges and combinations of sub-ranges encompassed therein. For example, disclosure of a time range is intended to disclose individually every possible time value that such a range could encompass, consistent with the disclosure herein.

Use of the term "about" is intended to describe values either above or below the stated value, which the term "about" modifies, in a range of approx. +/−10%; in other instances the values may range in value either above or below the stated value in a range of approx. +/−5%. When the term "about" is used before a range of numbers (i.e., about 1-5) or before a series of numbers (i.e., about 1, 2, 3, 4, etc.) it is intended to modify both ends of the range of numbers and/or each of the numbers recited in the entire series, unless specified otherwise.

II. Peroxide Selective Catalysts

A. Heterogeneous Catalysts

The peroxide selective catalysts can be used as heterogeneous electrocatalysts or photocatalysts. The catalyst can be disposed on the surface of a solid substrate, such as the surface of an electrode or the surface of a photoelectrode or the surface of a particulate photocatalyst dispersed in an aqueous phase. The peroxide selective catalysts are usually oxidatively, hydrolytically, and/or thermally stable.

The peroxide selective catalysts described typically are in the form of a layered peroxide selective catalyst. A layered peroxide selective catalyst can include:

(1) at least a first layer on a substrate wherein the at least first layer contains at least a first metal oxide alloyed or doped with at least one metal selected from the group consisting of manganese, chromium, vanadium, cobalt, nickel oxides thereof, and combinations thereof; and (2) at least a second layer wherein the second layer contains at least a second metal oxide which is optionally free or substantially free of the least one metal selected from the group consisting of manganese, chromium, vanadium, cobalt, nickel oxides thereof, and combinations thereof.

In some instances, the first and/or the second layers are formed by atomic layer deposition (ALD) and/or by sputtering at a predetermined deposition temperature. Methods of making the catalyst are detailed below.

In some instances, the first and/or the second layers of the layered peroxide selective catalyst are annealed. Annealing is usually carried out in air or under an inert atmosphere (such as nitrogen, argon, helium, or a mixture thereof) at a temperature ranging from between about 300 to 700° C., 300 to 600° C., or 300 to 500° C. for a period of time ranging from between about 0.1 to 3 hours, 0.1 to 2 hours, or 0.1 to 1 hours. In some instances, the annealing temperature is about 300° C., 350° C., 400° C., 450° C., 500° C., 550° C., or 600° C. In some instances, the annealing time is about 0.1, 0.5, 1, 1.5, 2, 2.5, or 3 hours. In some cases, the annealing may be carried out with controlled heating ramp rates and/or controlled cooling ramp rates, or heating and/or cooling may be uncontrolled. Suitable heating or cooling ramp rates include about 1° C./min, 2° C./min, 3° C./min, 4° C./min, or 5° C./min, or higher.

In some instances, the first and/or second metal oxide is formed of a metal oxide selected from a titanium dioxide, a tin oxide, a tungsten oxide, or a combination thereof. In some cases, the metal oxides of the first layer can include titanium dioxide (titanium(IV) oxide), titanium(II) oxide, titanium(III) oxide, tin(II) oxide, tin(IV) oxide, tungsten(III) oxide, tungsten(IV) oxide, tungsten(VI) oxide, tungsten pentoxide, or combinations thereof. In the case of the first layer these metal oxides are alloyed or doped with the at least one metal selected from the group consisting of manganese, chromium, vanadium, cobalt, nickel oxides thereof, and combinations thereof.

In some instances, the at least one metal alloyed or doped into the at least first layer is in the form of a metal oxide of manganese, chromium, vanadium, cobalt, or combinations thereof. Exemplary manganese oxides may include manganese(II) oxide, manganese(II,III) oxide, manganese(III) oxide, manganese(IV) oxide, manganese(VI) oxide, manganese(VII) oxide, and combinations thereof. Exemplary chromium oxides may include chromium(II) oxide, chromium (III) oxide, chromium(IV) oxide, chromium(VI) oxide), chromium(VI) oxide peroxide, and combinations thereof. Exemplary vanadium oxides may include vanadium(II) oxide, vanadium(III) oxide, vanadium(IV) oxide, vanadium (V) oxide, and combinations thereof. Exemplary cobalt oxides may include cobalt(II) oxide, cobalt(III) oxide, cobalt (II,III) oxide, nickel (I) oxide, nickel (II) oxide, nickel (III) oxide, nickel(II, III) oxide, nickel (IV) oxide, and combinations thereof.

In certain instances, the second layer is free or substantially free of the least one metal selected from the group consisting of manganese, chromium, vanadium, cobalt and nickel. "Substantially free," as used here in refers to an atomic percentage present in the layer of a metal which less than 5%, 4%, 3%, 2%, 1%, 0.9%, 0.8%, 0.7%, 0.6%, 0.5%, 0.4%, 0.3%, 0.2%, 0.1%, or less.

In some instances, the layered peroxide selective catalyst can be free or substantially free of iridium, ruthenium, or platinum. "Substantially free," as used here in refers to an atomic percentage present in the layer of a metal which less than 5%, 4%, 3%, 2%, 1%, 0.9%, 0.8%, 0.7%, 0.6%, 0.5%, 0.4%, 0.3%, 0.2%, 0.1%, or less.

The atomic percentage of the at least one metal doped (less than 5%) or alloyed (above 3% to 99.9%) in the at least first metal oxide is in the range of between about 1 and 75%, 1 and 70%, 1 and 60%, 1 and 50%, 10 and 50%, 20 and 50%, 30 and 50% of the first layer, either alone or in combination with the second layer. In some other instances the atomic percentage of the at least one metal doped or alloyed in the at least first metal oxide is at least about 1%, 5%, 10%, 15%, 20%, 25%, 30%, 35%, 40%, 45%, 50%, 55%, 60%, 70%, or 75% of the first layer, either alone or in combination with the second layer. In yet some other instances the atomic percentage of the at least one metal doped or alloyed in the at least first metal oxide is up to about 1%, 5%, 10%, 15%, 20%, 25%, 30%, 35%, 40%, 45%, 50%, 55%, 60%, 70%, or 75% of the first layer, either alone or in combination with the second layer. The atomic percentages in a layer may be determined by techniques such as X-ray photoelectron spectroscopy (XPS). The atomic percentages can be controlled by the parameters selected for the ALD or sputtering process, for example the pulse cycles, amongst other selected parameters discussed below. The ALD or sputtering process can also be used to control the spatial distribution of the least one metal doped or alloyed into the at least first metal oxide. For example, the spatial distribution across a cross-section or the thickness of the first layer may be uniform, non-uniform, or form a gradient. In one non-limiting example, when a gradient is formed the atomic percentage of the at least one metal doped or alloyed into the at least first metal oxide is highest (most concentrated) at the top surface of the layer/film and decreases in concentration through the film thickness toward the bottom surface, or vice versa.

In some instances, the metal oxide of the first layer is alloyed or doped with a metal selected from the group consisting of manganese, chromium, vanadium, cobalt, nickel, and can be defined according to Formula (1) or Formula (2):

$$M^1[(M^2_y)O_x] \qquad (1)$$

$$M^1[(M^2)O_x]_y \qquad (2)$$

where $M^1$ is selected from the group consisting of manganese, chromium, vanadium, cobalt, and combinations thereof; $M^2$ is selected from the group consisting of titanium, tin, tungsten, and combinations thereof; and y is a composition value which is a >0 real number, such as a value from 0-3, 0-2, 1-3, or 1-2, and x is a composition value which is a >0 real number, such as a value from 0-3, 0-2, 1-2, or 1-3. In some cases, x and y are each integer values of the specified ranges. In some instances, $(M^2)O_x$ of Formula (2) is a stoichiometric oxide.

Exemplary substrates on which the catalyst may be disposed on can include, but are not limited to, allotropes of carbon, such as carbon fiber, carbon wool, graphene, carbon nanotubes, etc., polymeric substrates (e.g., oxidatively resistant or conductive polymers), main group oxides such as tin-doped indium oxide (ITO), fluorine doped tin oxide (FTO), carbon-based electrodes (typically used in fuel cells), such as glassy carbon, wooly carbon, and conductive carbon fiber, and titanium metal foils, titanium plates, aluminum metal foils, aluminum plates. Only Ti metals and Al metals have shown not to decompose $H_2O_2$. The substrate may also be formed of conductive polymers, such as polyacetylenes, polyaromatics such as polyanilines, polyphenylyenes, polypyrenes, polyazulenes and polynaphthalenes, polyheterocycles such as polypyrroles, polyanilines, polyindoles, and polyazepines, and olefin containing polymers such as poly (p-phenylene vinylene. The substrates may be conductive substrates, photocatalytic substrates, or combinations thereof. Sputtering, chemical vapor deposition can be used for these inorganic substrates.

Extrusion, injection molding, hot pressing can be used for polymeric substrates.

Fibers and clothes can be woven, spin-casted or electro-spinned.

The thicknesses of the first layer and/or the second layer may independently be selected/controlled to be in the range of about 1-100 nm, 5-100 nm, 5-90 nm, 5-80 nm, 5-70 nm, 5-60 nm, 5-70 nm, 5-60 nm, 5-50 nm, 5-40 nm, 5-30 nm, 5-25 nm, 5-20 nm, or 5-10 nm. In some instances, the combined thickness of the first layer and/or the second layer is selected/controlled to be in the range of about 1-100 nm, 5-100 nm, 5-90 nm, 5-80 nm, 5-70 nm, 5-60 nm, 5-70 nm, 5-60 nm, 5-50 nm, 5-40 nm, 5-30 nm, 5-25 nm, 5-20 nm, or 5-10 nm.

In some instances, the at least first and the at least second layers together may be described as a nanolaminate which is a composite layer or film formed from different materials in a layered stack, where the layers may be alternating layers having a thickness on the order of nanometers. A nanolaminate is not limited to alternating layers of each material, but may include having several layers of one material alternating with a single layer of the other material, to obtain a desired ratio of the two or more materials. A nanolaminate may also include layers of one material formed by an ALD reaction either over or under a single layer of a different material formed by another type of reaction, such as a sputtering reaction. The layers of different materials may remain separate after deposition and/or annealing, or they may modified, such as by annealing.

The heterogeneous layered peroxide selective catalysts can exhibit significantly higher turnover numbers and turnover frequencies for water-oxidation to form hydrogen peroxide selectively, as compared to other known catalysts.

The heterogeneous layered peroxide selective catalysts can exhibit high turnover rates when bound to a substrate, as well as high stability. The catalysts, when used as electrocatalysts or photocatalysts, can produce hydrogen peroxide with Faradaic efficiencies of greater than about 50, 55, 60, 65, 70, 75, 80, 81, 82, 83, 84, 85, 86, 87, 88, 89, 90, 91, 92, 93, 94, 95, 96, 97, 98, or 99%.

B. Homogeneous Catalysts

The layered peroxide selective catalysts can be used as a homogeneous electrocatalyst or photocatalyst. The peroxide selective catalysts are usually oxidatively, hydrolytically, and/or thermally stable. In solution, the homogenous catalysts exhibit turn-over frequencies of from about 80 to about 200/minute, preferably about 70 to about 175/minute, more preferably about 85 to about 170/minute for water oxidation to form hydrogen peroxide.

In some other instances, the layered peroxide selective catalysts can be in the form of microparticles and/or nanoparticles. These microparticles and/or nanoparticles may be used in solution and may be recovered after a reaction. Microparticles may range in the size of between about 1 to 100 microns and nanoparticles may range in the size of between about 1 to 1000 nm. The particle size distribution of the aforementioned particles may be disperse or monodisperse.

In another embodiment the catalyst includes semiconductor particles of titanium oxide, strontium titanium oxide, bismuth vanadium oxide, tin oxide, zinc oxide (those photoactive light-absorbing semiconductors), which are decorated with selective hydrogen peroxide co-catalysts. Typically semiconductor particles are between 10 and 500 nm in diameter, and co-catalysts are between 1 and 50 nm in diameter. The selective hydrogen peroxide co-catalysts show two functionalities: one is selective oxidization of water to produce $H_2O_2$; and the other is selective reduction of dissolved $O_2$ nearby the photocatalyst to produce $H_2O_2$.

In one instance, the particulate form of a layered peroxide selective catalysts may contain:

(1) a core containing at least a metal oxide alloyed or doped with at least one metal selected from the group consisting of manganese, chromium, vanadium, cobalt, nickel oxides thereof, and combinations thereof; and (2) an outer-shell containing at least a second metal oxide which is optionally free or substantially free of the least one metal selected from the group consisting of manganese, chromium, vanadium, cobalt, nickel oxides thereof, and combinations thereof.

In some instances, the particles have been annealed. Annealing is usually carried out in air or under an inert atmosphere (such as nitrogen, argon, helium, or a mixture thereof) at a temperature ranging from between about 300 to 700° C., 300 to 600° C., or 300 to 500° C. for a period of time ranging from between about 0.1 to 3 hours, 0.1 to 2 hours, or 0.1 to 1 hours. In some instances, the annealing temperature is about 300° C., 350° C., 400° C., 450° C., 500° C., 550° C., or 600° C. In some instances, the annealing time is about 0.1, 0.5, 1, 1.5, 2, 2.5, or 3 hours. In some cases, the annealing may be carried out with controlled heating ramp rates and/or controlled cooling ramp rates, or heating and/or cooling may be uncontrolled. Suitable heating or cooling ramp rates include about 1° C./min, 2° C./min, 2° C./min, 3° C./min, 4° C./min, or 5° C./min, or higher.

In some instances, the core contains a metal oxide selected from a titanium dioxide, a tin oxide, or a tungsten oxide. In some cases, the metal oxides of the core can include titanium dioxide (titanium (IV) oxide), titanium (II) oxide, titanium (III) oxide, tin (II) oxide, tin (IV) oxide, tungsten (III) oxide, tungsten (IV) oxide, tungsten (VI) oxide, tungsten pentoxide, or combinations thereof. The metal which is alloyed or doped with the at least one metal oxide is selected from the group consisting of manganese, chromium, vanadium, cobalt, oxides thereof, and combinations thereof.

In some instances, the at least one metal alloyed or doped with the metal oxide of the core is a metal oxide of manganese, chromium, vanadium, cobalt, or combinations thereof. Exemplary manganese oxides may include manganese(II) oxide, manganese(II,III) oxide, manganese(III) oxide, manganese(IV) oxide, manganese(VI) oxide, manganese(VII) oxide, and combinations thereof. Exemplary chromium oxides may include chromium(II) oxide, chromium (III) oxide, chromium(IV) oxide, chromium(VI) oxide), chromium(VI) oxide peroxide, and combinations thereof. Exemplary vanadium oxides may include vanadium(II) oxide, vanadium(III) oxide, vanadium(IV) oxide, vanadium (V) oxide, and combinations thereof. Exemplary cobalt oxides may include cobalt(II) oxide, cobalt(III) oxide, cobalt (II,III) oxide, nickel (I) oxide, nickel (II) oxide, nickel (III) oxide, nickel(II, III) oxide, nickel (IV) oxide, and combinations thereof.

In certain instances, the outer shell is free or substantially free or is free or substantially free of the least one metal selected from the group consisting of manganese, chromium, vanadium, and cobalt. "Substantially free," as used here in refers to an atomic percentage present in the layer of a metal which less than 5%, 4%, 3%, 2%, 1%, 0.9%, 0.8%, 0.7%, 0.6%, 0.5%, 0.4%, 0.3%, 0.2%, 0.1%, or less.

In some instances, the particulate forms of the peroxide selective catalyst can be free or substantially free of iridium, ruthenium, or platinum. "Substantially free," as used here in refers to an atomic percentage present in the layer of a metal which less than 5%, 4%, 3%, 2%, 1%, 0.9%, 0.8%, 0.7%, 0.6%, 0.5%, 0.4%, 0.3%, 0.2%, 0.1%, or less.

The atomic percentage of the at least one metal doped or alloyed with the metal oxide in the core can range between about 1 and 75%, 1 and 70%, 1 and 60%, 1 and 50%, 10 and 50%, 20 and 50%, 30 and 50% of the core or of the core and the outer shell combined. In some other instances the atomic percentage of the at least one metal is at least about 1%, 5%, 10%, 15%, 20%, 25%, 30%, 35%, 40%, 45%, 50%, 55%, 60%, 70%, or 75% of the core or of the core and the outer shell combined. In yet some other instances the atomic percentage of the at least one metal is up to about 1%, 5%, 10%, 15%, 20%, 25%, 30%, 35%, 40%, 45%, 50%, 55%, 60%, 70%, or 75% of the core or of the core and the outer shell combined.

Representative methods to form the particles include 1) particle atomic layer deposition; 2) solution phase photo-deposition. Essentially, particles are fluidized and dispersed in a gas phase under a stream of carrier gas blowing particles to float against gravity, where their surfaces undergo typical ALD processes. For solution phase photo-deposition, precursors of Mn, Cr, and Ti, Sn, W, are coated on the outside of photocatalytic particles under illumination, so that these materials uniformly deposit over the particle surfaces to form a shell.

In some instances, the metal oxide of the first layer is alloyed or doped with a metal such as manganese, chromium, vanadium, cobalt, and can be defined according to Formula (1) or Formula (2):

$$M^1[(M^2_y)O_x] \quad (1)$$

$$M^1[(M^2)O_x]_y \quad (2)$$

where $M^1$ is selected from the group consisting of manganese, chromium, vanadium, cobalt, and combinations thereof; $M^2$ is selected from the group consisting of titanium, tin, tungsten, and combinations thereof; and y is a composition value which is a >0 real number, such as a value from 0-3, 0-2 1-3, or 1-2, and x is a composition value which is a >0 real number, such as a value from 0-3, 0-2, 1-2, or 1-3. In some cases, x and y are each integer values of the specified ranges. In some instances, $(M^2)O_x$ of Formula (2) is a stoichiometric oxide.

The homogeneous layered peroxide selective catalysts can exhibit high turnover rates when used in solution, as well as having high stability. The catalysts, when used as electrocatalysts or photocatalysts, can produce hydrogen peroxide with Faradaic efficiencies of greater than about 50, 55, 60, 65, 70, 75, 80, 81, 82, 83, 84, 85, 86, 87, 88, 89, 90, 91, 92, 93, 94, 95, 96, 97, 98, or 99%.

C. Properties of Peroxide Selective Catalysts

The catalysts can selectively oxidize water to hydrogen peroxide. It is believed that such selectivity results from catalytic surface(s) not favoring/disfavoring oxygen evolution kinetically, which allows for selective production of hydrogen peroxide directly from water.

The peroxide selective catalysts achieve the desired hydrogen peroxide pathway by control of the availability of energy levels which can turn on/select charge injection to key intermediates and simultaneously turn off/disfavor charge injection to undesirable intermediates. It is believed that alloying or doping of a metal oxide with metal(s), as described above and in the methods of making below, allow for intermediate bands (IBs) to be introduced inside the band gap of the wide band-gap semiconductor (i.e., metal oxide) for boosting its energy-conversion efficiency under solar spectrum. Introduction of an IB into the band gap is relevant because IB functions as a "stepping stone", allowing for pumping of electrons from the valence band (VB) to the conduction band (CB) to take place in two successive optical excitations, thus utilizing the infrared photons that are otherwise not absorbed. Such an IB can be created during a catalytic material's synthesis. In the instant case, alloying or doping select metal(s) into a metal oxide was effective for introduction of an IB into the parent metal oxide. Further, by controlling the doping/alloying parameters it was possible to tune the thermodynamic energy levels, which was used to control and select for the desirable pathways of water oxidation processes leading to hydrogen peroxide selectively, while avoiding undesirable ones.

The selective catalysts possess intermediate bands (IBs) in their band gap and the availability of electronic states at specific ranges of energy levels, with respect to the key reaction intermediates, can be adjusted as a function of the parameters of the catalyst's synthesis (i.e., atomic percentage of doped/alloyed metal; and spatial distribution or location of metal doped/alloyed metal oxide in the catalyst formed, for example). As discussed in the examples below, it was shown that by alloying/doping $MnO_x$ into $TiO_2$ that Mn-intermediate bands with as high as 70 atomic % $Mn^{2+}$ were incorporated into the ternary $(Ti,Mn)O_x$ layer and that the Fermi level of $TiO_2$ can be tunable by Mn incorporation. The experimental data revealed a close correlation between hydrogen peroxide selectivity and a unique intermediate-band electronic structure in the catalysts studied. It is believed that anodic charge conduction across the Mn-intermediate band modified $TiO_2$ films resulted from both enhanced hole conductivity and also due to a partially filled Mn-impurity intermediate band, within the otherwise forbidden bandgap of $TiO_2$, which matched the electronic states of key intermediates during water oxidation on the $TiO_2$ catalytic surfaces.

Thus, it is believed that introducing a tunable IB into the catalysts additionally enables charge transfer to "Metal-OH" intermediates needed for hydrogen peroxide generation and that, for example in electrochemical processes, using a modest overpotential can avoid the undesirable OH. pathway. As a result, the selective catalysts can exhibit almost 100% hydrogen peroxide selectivity owing to specific and unique properties: (1) the alloyed/doped catalysts demonstrate enhanced anodic activity compared to the metal oxide-rich surface; (2) the defect band (intermediate band) is tuned to match/closely match the energy level of hydrogen peroxide production intermediates; and (3) after equilibration, as a semiconductor, the band edge of the catalysts is not changed, which means the electronic structure can be designed for different pathways by changing the flat band positions.

As was shown in the $(Ti,Mn)O_x$ catalysts studied in the Examples, the alloyed or doped metal impurities are found inside the metal oxide matrix, leaving a metal oxide-rich surface. The catalysts include a layer or outer shell of metal oxide which is free or substantially free of the metal impurities which are alloyed or doped into another layer or core of the catalyst. In use, this layer or outer shell which is rich in metal oxide or essentially non-doped/non-alloyed metal oxide is another factor which is believed to be important for the catalysts to avoid active surfaces that can undesirably react with the as-produced hydrogen peroxide and decompose the hydrogen peroxide immediately. For example, Mn is not favorable for hydrogen peroxide accumulation because $Mn^{2+}$ ions catalyze its decomposition. Thus, by controlling the location of the doped/alloyed metal(s) in the catalyst it is possible to avoid such unwanted/undesirable issues with the decomposition of the desired product, which has not been reported in other catalytic systems.

In some instances the concentration of hydrogen peroxide accumulated and produced by use of the catalysts is between about 0.1 to 2.75 $mmol \cdot L^{-1}$, 0.5 to 2.75 $mmol \cdot L^{-1}$, 0.1 to 2.5 $mmol \cdot L^{-1}$, or 0.5 to 2.5 $mmol \cdot L^{-1}$ when the device is operated for at least 1, 2, 3, 4, 5, 6, 7, 8, 9, 10, 11, 12, 13, 14, 15, 16, 17, 18, 19, 20, 21, 22, 23, 24, 36, 48 hours, or longer. In some other instances, the concentration of hydrogen peroxide accumulated and produced by use of the catalysts is at least about 0.1, 0.5, 1.0, 1.5, 2.0, 2.5, or 2.75 $mmol \cdot L^{-1}$ when the device is operated for at least 1, 2, 3, 4, 5, 6, 7, 8, 9, 10, 11, 12, 13, 14, 15, 16, 17, 18, 19, 20, 21, 22, 23, 24, 36, 48 hours, or longer.

III. Methods of Preparing the Peroxide Selective Catalysts

The peroxide selective catalysts can be formed using techniques such as atomic layer deposition (ALD) or by known sputtering techniques.

In one instance, a method of forming a layered peroxide selective catalyst can include the steps of:

(1) depositing at least a first layer on a substrate by atomic layer deposition and/or by sputtering at a predetermined deposition temperature, wherein the at least first layer contains at least a first metal oxide alloyed or doped with at least one metal selected from the group consisting of manganese, chromium, vanadium, cobalt, nickel oxides thereof, and combinations thereof;

(2) depositing at least a second layer by atomic layer deposition and/or by sputtering at a predetermined temperature on the at least first layer;

wherein the second layer contains at least a second metal oxide which is optionally free or substantially free of the least one metal selected from the group consisting of manganese, chromium, vanadium, cobalt, oxides thereof, and combinations thereof; and (3) annealing the resulting layered peroxide selective catalyst.

In some instances, steps (1) and (2) may be optionally repeated to grow multi-layer structures to the desirable thickness for the peroxide selective catalyst, before the (3) annealing step.

In some instances, the first and/or the second layers of the layered peroxide selective catalyst were annealed. Annealing is usually carried out in air or under an inert atmosphere (such as nitrogen, argon, helium, or a mixture thereof) at a temperature ranging from between about 300 to 700° C., 300 to 600° C., or 300 to 500° C. for a period of time ranging from between about 0.1 to 3 hours, 0.1 to 2 hours, or 0.1 to 1 hours. In some instances, the annealing temperature is about 300° C., 350° C., 400° C., 450° C., 500° C., 550° C., or 600° C. In some instances, the annealing time is about 0.1, 0.5, 1, 1.5, 2, 2.5, or 3 hours. In some cases, the annealing may be carried out with controlled heating ramp rates and/or controlled cooling ramp rates, or heating and/or cooling may be uncontrolled. Suitable heating or cooling ramp rates include about 1° C./min, 2° C./min, 2° C./min, 3° C./min, 4° C./min, or 5° C./min, or higher.

In some instances, the first and/or second layer is formed of a metal oxide selected from a titanium dioxide, a tin oxide, or a tungsten oxide. The metal oxide of the first layer can include titanium dioxide (titanium(IV) oxide), titanium (II) oxide, titanium(III) oxide, tin(II) oxide, tin(IV) oxide, tungsten(III) oxide, tungsten(IV) oxide, tungsten(VI) oxide, tungsten pentoxide, or combinations thereof. In the case of the first layer these metal oxides are alloyed or doped with the at least one metal selected from the group consisting of manganese, chromium, vanadium, cobalt, nickel oxides thereof, and combinations thereof.

In some instances, the at least one metal alloyed or doped in the at least first layer containing a first metal oxide is in the form of a metal oxide of manganese, chromium, vanadium, cobalt, or combinations thereof. Exemplary manganese oxides may include manganese(II) oxide, manganese (II,III) oxide, manganese(III) oxide, manganese(IV) oxide, manganese(VI) oxide, manganese(VII) oxide, and combinations thereof. Exemplary chromium oxides may include chromium(II) oxide, chromium(III) oxide, chromium(IV) oxide, chromium(VI) oxide), chromium(VI) oxide peroxide, and combinations thereof. Exemplary vanadium oxides may include vanadium(II) oxide, vanadium(III) oxide, vanadium (IV) oxide, vanadium(V) oxide, and combinations thereof. Exemplary cobalt oxides may include cobalt(II) oxide, cobalt(III) oxide, cobalt(II,III) oxide, and combinations thereof.

In certain instances, the second layer is free or substantially free of the least one metal selected from the group consisting of manganese, chromium, vanadium, and cobalt. "Substantially free," as used here in refers to an atomic percentage present in the layer of a metal which less than 5%, 4%, 3%, 2%, 1%, 0.9%, 0.8%, 0.7%, 0.6%, 0.5%, 0.4%, 0.3%, 0.2%, 0.1%, or less.

The atomic percentage of the at least one metal doped or alloyed into the at least first metal oxide is in the range of between about 1 and 75%, 1 and 70%, 1 and 60%, 1 and 50%, 10 and 50%, 20 and 50%, 30 and 50% of the first layer, either alone or in combination with the second layer. In some other instances the atomic percentage of the at least one metal doped or alloyed in the at least first metal oxide is at least about 1%, 5%, 10%, 15%, 20%, 25%, 30%, 35%, 40%, 45%, 50%, 55%, 60%, 70%, or 75% of the first layer, either alone or in combination with the second layer. In yet some other instances the atomic percentage of the at least one metal doped or alloyed in the at least first metal oxide is up to about 1%, 5%, 10%, 15%, 20%, 25%, 30%, 35%, 40%, 45%, 50%, 55%, 60%, 70%, or 75% of the first layer, either alone or in combination with the second layer. The atomic percentages in a layer may be determined by techniques such as X-ray photoelectron spectroscopy (XPS).

The atomic percentages can be controlled by the parameters selected for the ALD or sputtering process, for example the pulse cycles, amongst other selected parameters discussed below. In some instances, the process of forming a layer may include 1-25, 1-20, 1-15, 1-10, or 1-5 cycles of deposition of precursor(s) to form a metal oxide, such as titanium oxide, followed by 1-25, 1-20, 1-15, 1-10, or 1-5 cycles of deposition of other precursor(s) to introduce the at least one metal, which may itself be an oxide of the metal, which is to be alloyed or doped in the metal oxide. In some instances, following deposition of the at least one metal another sequence of 1-25, 1-20, 1-15, 1-10, or 1-5 cycles of deposition of precursor(s) to form metal oxide, such as titanium oxide, may be repeated. In some instances, the process of forming a layer may include at least 1, 2, 3, 4, 5, 6, 7, 8, 9, 10, 11, 12, 13, 14, 15, 16, 17, 18, 19, 20 or more cycles of deposition of precursor(s) to form a metal oxide, such as titanium oxide, followed by at least 1, 2, 3, 4, 5, 6, 7, 8, 9, 10, 11, 12, 13, 14, 15, 16, 17, 18, 19, 20 or more cycles of deposition of other precursor(s) to introduce the at least one metal, which may itself be an oxide of the metal, which is to be alloyed or doped in the metal oxide. In some instances, following deposition of the at least one metal another sequence of at least 1, 2, 3, 4, 5, 6, 7, 8, 9, 10, 11, 12, 13, 14, 15, 16, 17, 18, 19, 20 or more cycles of deposition of precursor(s) to form metal oxide, such as titanium oxide, may be repeated. In some other instances, the ratio of number of cycles of deposition of precursor(s) to form a metal oxide, such as titanium oxide, to the number of cycles of deposition of other precursor(s) to introduce the at least one metal, which may itself be an oxide of the metal, which is to be alloyed or doped in the metal oxide is 1:1, 2:1, 3:1, 4:1, 5:1, 6:1, 7:1, 8:1, 9:1, 10:1, 11:1, 12:1, 13:1, 14:1, 15:1, or 16:1. Two $TiO_2$ deposition cycles in the beginning of a super cycle followed by one $MnO_x$ cycle, and the super cycles of 2:1 cycle ratio repeat The ALD or sputtering process can also be used to control the spatial distribution of the least one metal doped or alloyed into the at least first metal oxide. For example, the spatial distribution across a cross-section or the thickness of the first layer may be uniform, non-uniform, or form a gradient. In one non-limiting example, when a gradient is formed the atomic percentage of the at least one metal doped or alloyed into the at least first metal oxide is highest (most concentrated) at the top surface of the layer/film and decreases in concentration through the film thickness toward the bottom surface, or vice versa.

In some instances, the metal oxide of the first layer is alloyed or doped with a metal selected from the group consisting of manganese, chromium, vanadium, cobalt, and nickel, and can be defined according to Formula (1) or Formula (2):

$$M^1[(M^2_y)O_x] \quad (1)$$

$$M^1[(M^2)O_x]_y \quad (2)$$

where $M^1$ is selected from the group consisting of manganese, chromium, vanadium, cobalt, and combinations thereof; $M^2$ is selected from the group consisting of titanium, tin, tungsten, and combinations thereof; and y is a composition value which is a >0 real number, such as a value from 0-2 or 1-2, and x is a composition value which is a >0 real number, such as a value from 0-3 or 1-3. In some cases, x and y are each integer values of the specified ranges. In some instances, $(M^2)O_x$ of Formula (2) is a stoichiometric oxide.

Exemplary substrates on which the catalyst may be disposed on can include, but are not limited to, allotropes of carbon, such as carbon fiber, carbon wool, graphene, carbon nanotubes, etc., polymeric substrates (e.g., oxidatively resistant or conductive polymers), main group oxides such as tin-doped indium oxide (ITO), fluorine doped tin oxide (FTO), carbon-based electrodes (typically used in fuel cells), such as glassy carbon, wooly carbon, and conductive carbon fiber, and titanium metal foils, titanium plates, aluminum metal foils, aluminum plates. Only Ti metals and Al metals have shown not to decompose $H_2O_2$. The substrate may also be formed of conductive polymers, such as polyacetylenes, polyaromatics such as polyanilines, polyphenylenes, polypyrenes, polyazulenes and polynaphthalenes, polyheterocycles such as polypyrroles, polyanilines, polyindoles, and polyazepines, and olefin containing polymers such as poly (p-phenylene vinylene). The substrates may be conductive substrates, photocatalytic substrates, or combinations thereof.

The thicknesses of the first layer and/or the second layer may independently be selected/controlled to be in the range of about 1-100 nm, 5-100 nm, 5-90 nm, 5-80 nm, 5-70 nm, 5-60 nm, 5-70 nm, 5-60 nm, 5-50 nm, 5-40 nm, 5-30 nm, 5-25 nm, 5-20 nm, or 5-10 nm. In some instances, the combined thickness of the first layer and/or the second layer is selected/controlled to be in the range of about 1-100 nm, 5-100 nm, 5-90 nm, 5-80 nm, 5-70 nm, 5-60 nm, 5-70 nm, 5-60 nm, 5-50 nm, 5-40 nm, 5-30 nm, 5-25 nm, 5-20 nm, or 5-10 nm.

In some instances, the at least first and the at least second layers together may be described as a nanolaminate which is a composite layer or film formed from different materials in a layered stack, where the layers may be alternating layers having a thickness on the order of nanometers. A nanolaminate is not limited to alternating layers of each material, but may include having several layers of one material alternating with a single layer of the other material, to obtain a desired ratio of the two or more materials. A nanolaminate may also include layers of one material formed by an ALD reaction either over or under a single layer of a different material formed by another type of reaction, such as a sputtering reaction. The layers of different materials may remain separate after deposition and/or annealing, or they may modified, such as by annealing.

In Atomic layer deposition (ALD), gaseous precursors are introduced/exposed one at a time to the substrate surface mounted within a reaction chamber (or reactor). This introduction of the gaseous precursor(s) takes the form of sequential pulses of each gaseous precursor. In a pulse of a precursor gas, the precursor gas is made to flow into a specific area or region for a suitable period of time. Between the pulses, the reaction chamber is purged with a gas, which in many cases is an inert gas, and/or evacuated. Inert gases may include, for example, nitrogen gas, argon gas, helium gas, neon gas, or a combination thereof. Each cycle results in the formation of a layer or film, as detailed below. ALD reactions may be carried out a predetermined temperature in a reaction chamber which include temperatures in the range of between about 100° C. to 350° C., 100° C. to 300° C., 100° C. to 250° C., or 100° C. to 200° C. The parameters of each ALD reaction or pulse, such as choice of precursor(s), temperatures, etc. may be independently selected as needed to form the desired composition of a layer.

In the first step of the ALD process the first precursor saturates and is chemisorbed at the substrate surface, during the first pulse phase. Subsequent pulsing or exposure by a purging gas removes excess precursor from the reaction chamber, specifically the precursor that has not been chemisorbed.

A second pulse phase introduces a second precursor to the substrate where the growth reaction of the desired layer or film takes place, with a reaction thickness that depends upon the amount of the chemisorbed first precursor. Subsequent to the film growth reaction, any reaction by-products and any precursor excess are purged from the reaction chamber. With a precursor chemistry where the precursors adsorb and react with each other on the substrate, one ALD cycle can typically be performed in less than five, four, three, two, or one second in a suitable flow type reaction chambers. Typically, precursor pulse times range from about 0.5 seconds to about 2 to 3 seconds.

In ALD processes, the saturation of the reaction and purging phases can make the layer or film growth self-limiting. This self-limiting growth results in large area uniformity and conformality, which has important applications for such cases as planar substrates as well as more complex substrates, such as non-planar porous, pillar, trench, fiber, cloth, substrates. Significantly, ALD provides a means for controlling film thickness by controlling the number of ALD growth cycles.

The precursors used in an ALD process may be gaseous, liquid or solid. Liquid or solid precursors should be volatile with high vapor pressures or low sublimation temperatures. The vapor pressure should be high enough for effective mass transportation. Further, solid and certain liquid precursors may need to be heated inside the reaction chamber and introduced through heated tubes to the substrate(s). The necessary vapor pressure should be reached at a temperature below the substrate temperature to avoid the condensation of the precursors on the substrate. Due to the self-limiting growth mechanisms of ALD, relatively low vapor pressure solid precursors may be used, though evaporation rates can vary during the process because of changes in surface area.

Precursors suitable for depositing metal oxides, such as those discussed herein, are known. Exemplary metal-containing precursors include commercially available compounds containing titanium, manganese, tin, tungsten, chromium, vanadium, and cobalt. Titanium precursor compounds may include, but are not limited to tetrakis (dimethylamino) (TDMAT), titanium chloride, titanium, tetrakis (diethylamino) titanium (TDEAT), tetrakis(ethylmethylamino) titanium (TEMAT), (trimethyl)pentamethyl cyclopentadienyltitanium, cyclopentadienyl(cycloheptatrienyl) titanium, tris(2,2,6,6-tetramethyl-3,5-heptanedionato) titanium, pentamethyl cyclopentadienyltris(dimethylamino) titanium, titanium t-butoxide, titanium n-butoxide, titanium (di-i-propoxide)bis, titanium ethoxide, and titanium i-propoxide. Tin precursor compounds may include, but are not limited to bis(N,N'-di-i-propylacetamidinato)tin, tin chloride, N,N'-Di-t-butyl-2,3-diamidobutanetin, tetrakis(dimethylamino)tin, tetramethyltin, tin acetylacetonate, tin t-butoxide, and tin(II) hexafluoroacetylacetonate. Tungsten precursor compounds may include, but are not limited to bis(t-butylimido)bis(dimethylamino)tungsten, mesitylene tungsten tricarbonyl, tungsten carbonyl, tungsten chloride, and tungsten oxychloride. Manganese precursor compounds may include, but are not limited to bis(cyclopentadienyl) manganese, bis(N,N'-di-i-propylpentylamidinato)manganese, bis(ethylcyclo pentadienyl)manganese, bis(pentamethylcyclopentadienyl)manganese, bis (i-propylcyclopentadienyl)manganese, cyclopentadienylmanganese tricarbonyl, ethylcyclopentadienylmanganese tricarbonyl, tris(2,2,6,6-tetramethyl-3,5-heptanedionato)manganese, and manganese carbonyl. Chromium precursor compounds may include, but are not limited to chromium chloride, bis(cyclopentadienyl) chromium, bis(ethylbenzene)chromium, bis (pentamethylcyclopentadienyl)chromium, bis(i-propylcyclopentadienyl) chromium, chromium acetylacetonate, chromium carbonyl, chromium(III) hexafluoroacetylacetonate, and tris(2,2,6,6-tetramethyl-3,5-heptanedionato)chromium. Vanadium precursor compounds may include, but are not limited to tetrakis(ethylmethylamino)vanadium, tetrakis(diethylamino) vanadium, tetrakis(dimethylamino)vanadium, bis (cyclopentadienyl) vanadium, cyclopentadienylvanadium tetracarbonyl, vanadium acetylacetonate, vanadium trichloride oxide, and vanadium tri-i-propoxy oxide. Vanadium precursor compounds may include, but are not limited to bis(N-t-butyl-N'-ethylpropanimidamidato)cobalt, bis(N,N'-di-i-propylacetamidinato)cobalt, bis(1,4-di-t-butyl-1,3-diazabutadienyl)cobalt, bis(cyclopentadienyl)cobalt, cobalt carbonyl, cobalt carbonyl nitrosyl, cyclopentadienylcobalt dicarbonyl, (3,3-dimethyl-1-butyne)dicobalt hexacarbonyl, and tris(2,2,6,6-tetramethyl-3,5-heptanedionato)cobalt. Nickel: nickel acetylacetonate, cyclopentadienylnickel, bis (N,N'-di-t-butylacetamidinato) nickel(II), Mixtures of the aforementioned metal-containing precursors may be used during an ALD process. Co-reactants or second precursors, such as water or water vapor, methanol, ozone, or ionized oxygen by plasma may be used during ALD in combination with above metal containing precursor compounds, to permit formation of metal oxides thereof.

The ALD precursors demonstrate thermal stability at the substrate temperature. The precursor compounds should chemisorb on, or react with, the surface, though the interaction between the precursor and the surface. The precursors at the substrate surface should react with the second precursor (or co-reactant) to form the desired layer or film. Preferably, any by-products of the reaction should be gaseous in order to allow their removal with ease from the reaction chamber during a purge stage. Finally, the by-products should not react or adsorb on the surface of the substrate or layer/film formed.

ALD processes allow for formation of layers or films that can be layered in equal metered cycles or sequences that are all identical in chemical kinetics, deposition per cycle, composition, and thickness. Alternatively, unequal cycles or sequences that are not identical in such parameters may be used. ALD sequences may deposit a complete/full layer or less than a full layer per cycle. Typically, a deposition or growth rate of a layer formed by ALD can be about 0.25 to about 2.00 Å per cycle.

Use of ALD allows for control of continuity at an interface, avoidance of poorly defined nucleating regions, conformality over a variety of substrate topologies due to the layer-by-layer deposition nature of the process, use of low temperature and mildly oxidizing processes, control of growth thickness dependent solely on the number of cycles performed, and ability to engineer multilayer laminate films with resolution of one to two monolayers. ALD processes allow for deposition control on the order of single monolayers and the ability to deposit monolayers of films, such as those described herein.

In some non-limiting instances, a cycle of an ALD deposition includes, for example, pulsing a precursor material, pulsing a purging gas for the precursor, pulsing a second precursor and/or co-reactant, and pulsing the second precursor and/or co-reactant's purging gas, resulting in a controlled deposition thickness that depends upon the amount of the first precursor that adsorbs onto, and saturates, the surface. This cycle may be repeated for any suitable number of times until the desired thickness of the layer or film is achieved. In some instances, it may be alternated with pulsing of a third precursor material, pulsing a purging gas for the third precursor, pulsing a fourth precursor or co-reactant precursor, and pulsing the reactant's purging gas. In some cases, there is no need for a co-reactant if the precursor can interact with the substrate directly.

As a non-limiting example, in the methods described above, in the first step at least a first layer of titanium oxide (or other metal oxide) can be formed on a substrate mounted in a reaction chamber using atomic layer deposition (ALD). This can include forming one or more titanium oxide layers using a precursor gas, such as TDMAT and a co-reactant which is water vapor. By way of sequential deposition, the layer may be alloyed or doped with a second metal or metal oxide using ALD, as described. ALD allows control of the number of layers, thicknesses, spatial distribution of the alloyed or doped second metal or metal oxide in the first layer, and the relative atomic percentage present in the layer by facile control of the ALD deposition process (i.e., cycles and parameters thereof). In the second step of the method, ALD may be used to form at least a second layer of a metal oxide, as described above, which may be free or substantially free of a metal or metal oxide.

In some instances, the method of forming a peroxide selective catalyst is carried out using known sputtering techniques, such as cold sputtering, radio-frequency or direct-current magnetron sputtering. As noted above other methods such as particle atomic layer deposition and solution phase photodeposition can be used to form core-shell catalysts.

IV. Methods of Use

A. Selective Water Oxidation to Hydrogen Peroxide

The catalysts can be used in a variety of devices. In one embodiment, the device is an electrochemical device, such as an electrolyzer. In some other instances, the device is a photochemical device.

FIG. 7 shows a non-limiting example of a device which is a cell containing at least an anode (200), a cathode (300) each on suitable substrates (100 or 110) and having a water/aqueous medium (150). The devices, such as shown in FIG. 7, do not require any membranes (i.e., are membraneless devices) to function. In some instances, the cathode or anode may contain the heterogeneous catalysts disposed on one or more surface(s) of the cathode and/or anode. Alternatively, the homogeneous catalysts may be in the form of a suspension of the catalyst, as part of the water/aqueous medium, and can be recovered by any suitable means, such as filtration or centrifugation, following use of the device. The anode and cathode can be made from materials known in the art. The substrates (100 and 110) may be made of any suitable material, such as metal or an inert plastic (such as polycarbonate), but preferably a material which does not cause decomposition of hydrogen peroxide. Not shown in FIG. 7 are electrical connections to the anode or cathode when the device is an electrochemical device. In the case that the device is a photochemical device the cell may be irradiated with electromagnetic radiation (i.e., light) to drive the anodic and cathodic reaction for water oxidation. When used as a photochemical device the cell comprises substrates, anodes, or cathodes which are optically transparent to electromagnetic radiation suitable to drive the oxidation process. The water/aqueous medium (150) may be water alone or an aqueous medium containing buffer salt(s), such as phosphate buffer salts (potassium phosphate monobasic and potassium phosphate dibasic). Although FIG. 7 shows the water/aqueous medium as static it is also possible for the water/aqueous medium to be flowed through/between the anode and cathode. In either case, the water/aqueous medium is exposed to a stimulus (electrically or photochemically) that causes the selective catalysts on the anode and/or cathode to oxidize the water to form hydrogen peroxide. The water/aqueous medium may have any suitable pH and may be acidic, neutral, or alkaline in pH and the pH may be adjusted using suitable inorganic or organic acids or bases. The devices can conduct the desired water oxidation reaction on any scale, including industrial scale. For example, the optional interconnects (120) allow for a multitude of devices to be stacked, as needed, to increase the scale/throughput for continuous production. Further, optional flow channels (130) may be included to pass other gasses or liquids needed for operation of the device. In instances where the device is an electrochemical cell, the cell is operated at sufficiently high current densities and low applied cell potentials to achieve a large hydrogen peroxide production rates with high current efficiencies. The devices may be operated for defined periods of time (i.e., cycles of minutes, hours, days, weeks) or may be operated continuously, as conditions permit.

The selective catalysts of the devices catalyze oxidation of water to hydrogen peroxide as the only or substantially the only product of the oxidation of the water. Only is intended to mean that the only reaction catalyzed by the catalyst is the oxidation of water to form hydrogen peroxide described by the following reaction:

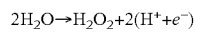

$$2H_2O \rightarrow H_2O_2 + 2(H^+ + e^-)$$

Or that the above reaction is favored above other possible reactions (such as water oxidation to O2: $2H_2O \rightarrow O_2 + 4(H^+ + e^-)$, or hydroxyl oxidation to hydroxyl radicals: $*-OH \rightarrow OH.+e-$ where * means surface-bound sites) and that substantially the only product formed is hydrogen peroxide representing greater than about 50%, 60%, 70%, 80%, 90%, 91%, 92%, 93%, 94%, 95%, 96%, 97%, 98%, 99%, or greater of the relative amount of product(s)/by-product(s) formed during a cycle of operation of the device. The hydrogen peroxide produced in the devices can be accumulated to high concentration and then separated from the water/aqueous medium using any suitable technique. The hydrogen peroxide isolated can be purified, as needed, and stored until use and optional stabilizers (which are known in the art) may be added to slow or prevent decomposition of the hydrogen peroxide, especially at alkaline pH, or metal impurities. Unreacted water from the water/aqueous medium can be recycled and reused again to obtain hydrogen peroxide in further catalytic cycles of the devices. Methods of determining the presence and/or amount of hydrogen peroxide produced from water oxidation are known. Such methods include, but are not limited to, commercially available peroxide test strips, permanganate titration techniques, and iodometric titration techniques.

The selective catalysts can be incorporated into one or more of the devices discussed above or other devices suitable for water-oxidation and the devices sold to the end user. In some instances, the devices may be used for on-demand production of hydrogen peroxide whereas as currently hydrogen peroxide may need to be produced off-site and transported to a final location for use. The catalysts and/or devices thereof can be provided in a kit. The kits contains the catalyst in a container, along with instructions for use of the catalyst, and the end user incorporates the catalyst into one of the devices discussed above or another device useful for water oxidation. For industrial scale processes, the amount of catalyst to be used can vary from grams to kilograms to pounds. One of ordinary skill can readily determine the amount of catalyst need for a particular application on a particular scale.

For the devices described herein formation and accumulation of hydrogen peroxide can occur at molar quantities, which has previously been very difficult to achieve. In some instances the concentration of hydrogen peroxide accumulated and produced by the devices can range from about 0.1 to 2.75 mmol·L$^{-1}$, 0.5 to 2.75 mmol·L$^{-1}$, 0.1 to 2.5 mmol·L$^{-1}$, or 0.5 to 2.5 mmol·L$^{-1}$ when the device is operated for at least 1, 2, 3, 4, 5, 6, 7, 8, 9, 10, 11, 12, 13, 14, 15, 16, 17, 18, 19, 20, 21, 22, 23, 24, 36, 48 hours, or longer. In some other instances the concentration of hydrogen peroxide accumulated and produced by the devices can be at least about 0.1, 0.5, 1.0, 1.5, 2.0, 2.5, or 2.75 mmol·L$^{-1}$ when the device is operated for at least 1, 2, 3, 4, 5, 6, 7, 8, 9, 10, 11, 12, 13, 14, 15, 16, 17, 18, 19, 20, 21, 22, 23, 24, 36, 48 hours, or longer.

The selective catalysts can also be used in a method for oxidizing water to selectively form hydrogen peroxide where the method includes the steps of (1) contacting the catalyst with water or an aqueous solution; and applying an effective amount of a stimulus to drive oxidation of the water or to drive oxidation of the water in the aqueous solution to form hydrogen peroxide as the only or substantially the only product of the oxidation of the water, as described in detail above. The method may be carried out in an electrochemical device or photochemical device.

The hydrogen peroxide produced according to the disclosure found herein can be used as an oxidant for chemical and environmental applications, such as pulp bleaching, chemical-mechanical actuation, waste water treatment, and as a fuel source. In one example, the production of hydrogen peroxide may be considered a fuel which may be used in a grid energy storage system. Further, the hydrogen produced potentially enables a wide range of applications in energy conversion and storage.

EXAMPLES

Example 1. Production of Hydrogen Peroxide Catalytic Device

Atomic Layer Deposition (ALD) Growth and Annealing (Ti,Mn)O$_x$, TiO$_x$, and MnO$_x$ films (ca. 50 nm) were deposited onto both quartz and fluorine doped tin oxide (FTO) substrates, all using an Ultratech Fiji G2 ALD system. The reaction chamber was kept at 150° C. with an Ar (99.9997%) flow of 60 sccm in the delivery lines. Films grown on quartz were used for thin film characterization, and films grown on FTO were used for electrode fabrication and hydrogen peroxide production and quantification. Prior to ALD deposition, the FTO substrates were sonicated in ethanol for 30 min, dried under a N$_2$ flow, and loaded immediately into the ALD chamber.

Tetrakis-dimethylamido-titanium (TDMAT, Sigma-Aldrich, 99.999% bis-(ethylcyclopentadienyl) and manganese (Mn(EtCp)$_2$, Sigma-Aldrich, 99.999%) precursors were used as the Ti and Mn sources, respectively, and water was used as the co-reactant for oxide thin-film growth.

The general process for growing (Ti,Mn)O$_x$ alloy films was by depositing 2, 4, 8, or 16 cycles of TiO$_2$ followed by 1 cycle of MnO$_x$, then depositing 2, 4, 8, or 16 cycles of TiO$_2$, forming a TiO$_2$/MnO$_x$/TiO$_2$/MnO$_x$/TiO$_2$/MnO$_x$ repeating until reaching the desired thickness of 50 nm. The final thickness of all film samples was ca. 50 nm. A more detailed description of the ALD process can be found in Wang, T. et al. Biosensor based on ultrasmall MoS$_2$ nanoparticles for electrochemical detection of hydrogen peroxide released by cells at the nanomolar level. *Analytical chemistry* 85, 10289-10295 (2013)).

After their growth, all (Ti,Mn)O$_x$ films formed by ALD were annealed in air at 500° C. for 2 hours. The temperature was increased at a 4° C.·min$^{-1}$ ramp rate, and then cooled down without active cooling.

Electrode Fabrication Ohmic contacts were formed by soldering indium (In) onto exposed portions of the FTO surfaces. The contacts were then attached to coiled tin-plated Cu wires using Ag paste. The Cu wire was threaded through a glass tube and the samples were encapsulated and sealed to the tube using epoxy (Hysol 9460F). An optical scanner was used to image the exposed electrode and ImageJ (open-source software made available by NIH) was used to calculate electrode area.

Characterization

To determine the atomic composition of the ALD-grown films, 50 nm thin films of (Ti,Mn)O$_x$ deposited onto Fluorine-doped Tin oxide (FTO) glass were evaluated by X-ray photoelectron spectroscopy (XPS) measurements taken on a PHI VersaProbe II Scanning XPS Microprobe. The elemental spectra of O1s, C1s, Mn2p, Mn3s, and Ti2p, and the valence spectra of Au foil and (Ti,Mn)O$_x$ films were measured. For valence band (VB) measurements, all the (Ti,Mn)O$_x$ samples were in a good electrical contact with sample holder and the sputter-cleaned gold foil was used as an reference to calibrate the binding energy to $E_F$=0 eV. All XPS data were then processed using the CasaXPS software. All valence XPS spectra were fitted with Gaussian peaks after a Shirley background subtraction, with the peak area ratios based on the calculated mole fractions of the elements and the peak positions fitted according to the reported electronic states of the elements (Luciu, I., Bartali, R. & Laidani, N. Influence of hydrogen addition to an Ar plasma on the structural properties of TiO$_{2-x}$ thin films deposited by RF sputtering. *Journal of Physics D: Applied Physics* 45, 345302 (2012).).

A Hitachi SU8230 UHR Cold Field Emission (SEM) was used to characterize both film thickness and surface morphology before and after sample annealing.

Crystallinity and phases of (Ti,Mn)O$_x$ films on quartz substrates were identified by Grazing Incidence X-ray Diffraction (GIXRD) characterization using a Rigaku SmartLab X-ray diffractometer equipped with high-resolution parallel beam optics. A 1.5 kW copper tube operated at 20 kV and 2 mA; and the angle ($\omega$) of X-ray incidence was fixed at 0.24° and 2-theta (2θ) scan was carried out from 20° to 60°.

Electrochemical Measurements

All chemicals were used as received without any further purification. Phosphoric acid (H$_3$PO$_4$, 85 wt % in H$_2$O), potassium phosphate monobasic (KH$_2$PO$_4$, ≥98%), and potassium phosphate dibasic (K$_2$HPO$_4$, ≥98%) were purchased from Sigma-Aldrich. H$_2$O was obtained from a Millipore deionized water system with a resistivity of 18.0 MΩ·cm. These reagents were used to prepare 0.5 M phosphate buffer (PB) solutions of pH=3, 7, and 9. 0.1 N standard titration potassium permanganate (KMnO$_4$) solution was purchased from Alfa-Aesar, and sulfuric acid was purchased from Sigma-Aldrich.

The electrochemical behavior of (Ti,Mn)O$_x$ film electrodes were measured in a three-electrode setup. A Bio-Logic 5200 Potentiostat system connected the working electrode, an Ag/AgCl reference electrode in saturated KCl, and a Ti foil counter electrode.

Cyclic voltammetry was acquired with a scan rate of 20 mV·s$^{-1}$ and chronopotentiometry (CP)/chronoamperometry (CA) were used for product quantification and stability testing. To quantify the resistance through the (Ti,Mn)O$_x$ films, electrochemical impedance spectroscopy (EIS) was employed. All reported values are corrected by subtracting the background and uncompensated electrolyte resistance. Uncompensated electrolyte series resistance was extracted from the EIS data fitting, and then corrected for the measured electrochemical current-potential behavior.

Hydrogen Peroxide ($H_2O_2$) Quantification

The generated hydrogen peroxide molar quantity was detected using both standard hydrogen peroxide strips (Indigo Instruments) and via $KMnO_4$ titration. Dark purple $MnO_4^-$ will be reduced to a clear solution by hydrogen peroxide based on the following reaction:

$$2MnO_4^- + 5H_2O_2 + 6H^+ \rightarrow 2Mn^{2+} + 5O_2 + 8H_2$$

Therefore, the total molar quantity (n) of hydrogen peroxide generated can be calculated according to the following relationship, $$n(H_2O_2) = (5/2)n(MnO_4^-)$$

During this process, 0.5 M $H_2SO_4$ was used as the proton ($H^+$) source. Seven standard hydrogen peroxide solutions (1, 3, 10, 25, 50, 75, and 100 ppm) were prepared and tested using the standard strips. The same series of hydrogen peroxide standards were also quantified by the $KMnO_4$ titration. Optical spectroscopy was used to determine the titration end point (not shown here). The results from both quantification methods were found consistent.

Faradic efficiency (FE) for hydrogen peroxide production, measured as a percentage, was calculated based on the following equation:

$$FE = \frac{\text{Amount of experimentally generated } H_2O_2 (\text{mol})}{\text{Amount of theoretically generated } H_2O_2 (\text{mol})} \times 100\%$$

where the amount of experimentally generated hydrogen peroxide can be calculated based on permanganate titration reaction shown above, and the amount of theoretically generated hydrogen peroxide was calculated based on the measured total charge passed at the electrode, assuming a FE=100% for 2e− water oxidation, as shown in the following equation:

$$\text{Amount of theoretically generated } H_2O_2(\text{mol}) = \frac{\text{Charge passed }(c)}{F \times 2}$$

where F is the Faraday constant (96485.3 C·mol$^{-1}$). In addition, three pure standard solution were mixed with 0, 0.005, and 0.01 mL $KMnO_4$, respectively, and titrated as a standard line to define the titration destination (not shown here).

Results

Energetic and Electronic properties of bulk $(Ti,Mn)O_x$ Films

The Ti and Mn alloyed composition is believed to affect the electronic properties of (Ti,Mn)Ox, thereby influencing the catalytic activity and selectivity during the water oxidation process.

In order to investigate the optimal alloy ratio for selective hydrogen peroxide production, nominally 2:1, 4:1, 8:1, and 16:1 $(Ti,Mn)O_x$ films were grown by an atomic layer deposition (ALD) process (see details above).

For instance, 2:1 is the nominal ratio for the ratio of ALD growth cycles for $TiO_2$ and $MnO_x$ (mainly showing an oxidation state of +2), e.g. two $TiO_2$ deposition cycles in the beginning of a super cycle followed by one $MnO_x$ cycle, as described above, to produce $TiO_2/MnO_x/TiO_2/MnO_x/TiO_2/MnO_x$ having the desired thickness of 50 nm. This nominal ratio is correlated with, but not equal to, the elemental composition, (e.g. 2:1 $TiO_2$:$MnO_x$ cycle numbers do not result in a 33% Mn composition but in 51% Mn, as discussed in Siddiqi, G.; Luo, Z.; Xie, Y.; Pan, Z.; Zhu, Q.; Röhr, J. A.; Cha, J. J.; Hu, S., Stable water oxidation in acid using manganese-modified $TiO_2$ protective coatings. *ACS Applied Materials & Interfaces* 2018, 10 (22), 18805-18815. All the $(Ti,Mn)O_x$ films studied herein were annealed (as detailed in the experimental details above). It is believed that diffusion of Mn may occur, which can move Mn atoms positions in the film and crystallization which change composition and porosity of film, resulting from the annealing process.

Figure 1A:
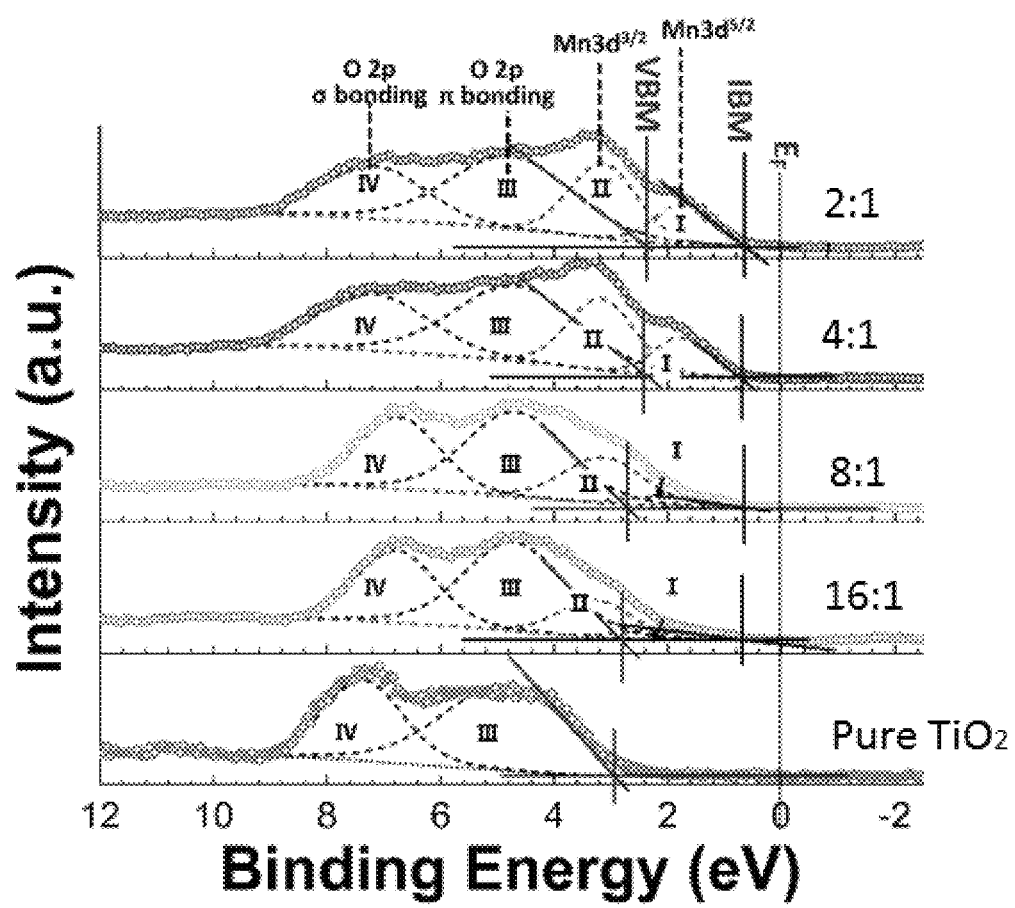
FIG. 1A shows the valence XPS spectra of 2:1, 4:1, 8:1, 16:1 $(Ti,Mn)O_x$ and pure $TiO_2$ films. The valence band maximum (VBM), intermediate band maximum (IBM), and the Fermi level ($E_F$) positions are also indicated.

Valence XPS analysis of a pure $TiO_2$ film was compared with $(Ti,Mn)O_x$ films, as shown in FIG. 1A. The pure $TiO_2$ film is composed of two main peaks, one at the binding energy of 5.43 eV (denoted Peak III) and the other at around 7.93 eV (denoted Peak IV) (Umebayashi, T., Yamaki, T., Itoh, H. & Asai, K. Analysis of electronic structures of 3d transition metal-doped $TiO_2$ based on band calculations. *J Phys Chem Solids* 63, 1909-1920, (2002)). The Fermi level positions ($E_F$) of all samples evaluated were located at 0.0 $V_{RHE}$ using the Au valence spectra as a reference. Peak III was attributed to the a bonding state hybridized between O 2p-σ and Ti 3d-$e_g$ levels and Peak IV was attributed to the π bonding state hybridized between O 2p-π and Ti 3d-$e_g$ (Umebayashi, T., Yamaki, T., Itoh, H. & Asai, K. Analysis of electronic structures of 3d transition metal-doped $TiO_2$ based on band calculations. *J Phys Chem Solids* 63, 1909-1920, (2002)).

As further shown in FIG. 1A, valence XPS spectra of $(Ti,Mn)O_x$ films also contain these two primary peaks of pure $TiO_2$. For example, the valence spectrum of 2:1 (Ti, Mn)$O_x$ was deconvoluted into four peaks: primary peaks are located around 4.72 eV (Peak III) and 7.16 eV (Peak IV); and two additional peaks (denoted Peak I at around 1.76 eV and Peak II at around 3.14 eV) found in the lower binding energy region and closer to the Fermi level position ($E_F$ at zero binding energy). Peaks I and II were attributed to the Mn 3d-$e_g$ and 3d-$t_{2g}$ bands (Henrich, V. E. & Cox, P. A. *The surface science of metal oxides.* (Cambridge university press, 1996)). The valence band maximum ($E_{VBM}$) positions and the intermediate band maximum ($E_{IBM}$) positions were evaluated by baseline intersection of linear fits of valence band edges (tangent lines shown at Peak III) and intermediate band edges (tangent lines shown at Peak I).

Figure 1B:
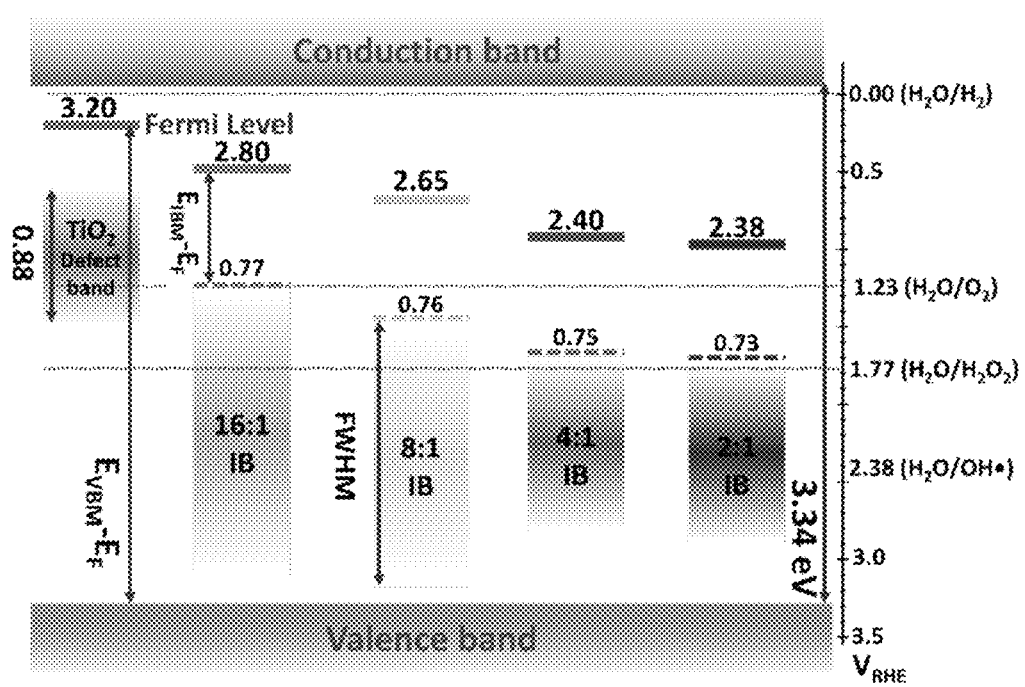
FIG. 1B shows the energy diagrams (in scale versus Reversible Hydrogen Electrode (RHE)) of 2:1, 4:1, 8:1, 16:1 $(Ti,Mn)O_x$ and pure $TiO_2$ films. The valence band maximum (VBM), intermediate band (TB), conduction band (CB), and the Fermi ($E_F$) level positions are also indicated. The gradient-boxes indicate the intermediate-band (TB) density of state distribution.

Based on the valence XPS spectra obtained, the relative energy levels of band edges and intermediate bands can be assigned with respect to Reversible Hydrogen Electrode (RHE), as shown in FIG. 1B. The conduction band (CB) edge of $TiO_2$ is located at −0.05 V $V_{RHE}$ and the band gap is 3.34 eV, as previously reported (Yang, Y. & Hoffmann, M. R. Synthesis and Stabilization of Blue-Black $TiO_2$ Nanotube Arrays for Electrochemical Oxidant Generation and Wastewater Treatment. *Environmental Science & Technology* 50, 11888-11894, doi:10.1021/acs.est.6b03540 (2016); and Hu, S. et al. Amorphous TiO2 coatings stabilize Si, GaAs, and GaP photoanodes for efficient water oxidation. Science 344, 1005-1009 (2014)).

The binding energies and the relative binding energy differences between $E_{VBM}$ and $E_F$, namely $E_{VBM}-E_F$ and $E_{IBM}-E_F$, are also shown in FIG. 1B and are listed in Table 1 below.

TABLE 1

Binding energies and full-width at half-maxima of Peaks I through IV, energy positions of valence band maximum (VBM) and intermediate band maximum (IBM) with respect to the Fermi level ($E_F$) positions, and Mn atomic compositions (%) of the (Ti, Mn)$O_x$ thin films that were annealed in air at 500° C. degrees for 2 hours

| Ti:Mn | | Peak I Mn3d $^{5/2}$ | Peak II Mn3d $^{3/2}$ | Peak III $\pi$ ($t_{2g}$) | Peak IV $\sigma$ ($e_g$) | $E_{VBM} - E_F$ | $E_{IBM} - E_F$ | Mn % | Mn %* |
|---|---|---|---|---|---|---|---|---|---|
| 2:1 | BE (eV) | 1.76 | 3.14 | 4.72 | 7.16 | 2.38 | 0.75 | 51.0 | 51 |
| | FWHM (eV) | 1.19 | 1.39 | 2.55 | 2.09 | | | | |
| | A (%) | 10.38 | 23.41 | 41.52 | 24.69 | | | | |
| 4:1 | BE (eV) | 1.77 | 3.17 | 4.68 | 7.15 | 2.40 | 0.76 | 34.4 | 37 |
| | FWHM (eV) | 1.14 | 1.40 | 2.58 | 2.30 | | | | |
| | A (%) | 9.58 | 21.5 | 43.34 | 25.58 | | | | |
| 8:1 | BE (eV) | 2.12 | 3.24 | 4.77 | 6.83 | 2.65 | 0.76 | 26.7 | 26 |
| | FWHM (eV) | 1.63 | 1.700 | 2.12 | 1.66 | | | | |
| | A (%) | 5.86 | 19.77 | 45.95 | 30.43 | | | | |
| 16:1 | BE (eV) | 2.12 | 3.28 | 4.71 | 6.78 | 2.80 | 0.76 | 19.2 | 18 |
| | FWHM (eV) | 1.81 | 1.51 | 2.09 | 1.65 | | | | |
| | A (%) | 4.31 | 14.84 | 49.04 | 31.84 | | | | |
| 1:0 | BE (eV) | / | / | 5.43 | 7.93 | 3.20 | / | / | / |
| | FWHM (eV) | / | / | 2.68 | 1.66 | | | | |
| | A (%) | / | / | 37.46 | 65.54 | | | | |

BE is short for the binding energy in eV.
FWHM is short for the full-width at half-maximum in eV.
A indicates the percentage area of the spectral peaks ratio to the composition in core level XPS.
$E_{VBM} - E_F$ is the difference in energy levels between the VBM and the Fermi level. The VBM is assigned by O 2p-$\pi$ state.
$E_{VBM} - E_F$ is the difference in energy levels between the IBM and the Fermi level. The IBM is determined by the Mn 3d $^{5/2}$ state.
Mn % is Mn elements peaks area ratio in VB spectra.
*denotes values are from Pham, H. H. & Wang, L.-W. Oxygen vacancy and hole conduction in amorphous TiO$_2$. *Phys Chem Chem Phys* 17, 541-550 (2015).

As the Mn molar composition increased, the Fermi level positions of (Ti,Mn)O$_x$ were lowered towards the valence band maximum (VBM), e.g. $E_{VBM}$–$E_F$ from 3.20 eV for pure TiO$_2$ to 2.38 eV of 2:1 (Ti,Mn)O$_x$ films. Valence spectra analysis indicated that intermediate bands (IBs) were created and located between the valence band (VB) and the conduction band (CB), with its intermediate band maximum (IBM) 0.73 eV and 0.77 eV below the respective Fermi level for the 16:1 and 2:1 (Ti:Mn)O$_x$, respectively. For the different (Ti:Mn)O$_x$ films the $E_{VBM}$–$E_F$ are almost identical due to the IB arising from what is believed to be the same oxidation state of Mn cations. The peak deconvolution indicated that the IB bands overlapped with the VB, and the Fermi level ($E_F$) was located closer to $E_{IBM}$ than $E_{VBM}$. It is believed that free and mobile electrons fill the Mn IB up to the Fermi level. Because of electron trapping, the Fermi level will only approach mid-gap of TiO$_2$ due to lack of acceptor levels for p-type doping. The electronic structure analysis suggested that the IB would act as the new charge-transport band. As the IB transport charges to the (Ti,Mn)Ox surface, these charge inject to liquids at the energy level of the IB states. In addition, the IB conducts (because IBM is below $E_F$) electrons from Ohmic back contacts to the electronic states of the catalytic intermediates at the surface.

Core-level XPS of O 1s, Ti 2p, Mn 2p, and Mn 3s of all compositions of (Ti,Mn)O$_x$ films were also measured (not shown here). As the Mn composition increased, the O 1s peak positions shifted to higher binding energies and the Ti 2p peaks and Mn 2p$^{3/2}$ shifted to lower binding energies. The Mn 3s peak had two split components caused by the coupling of the non-ionized 3s electron with 3d valence-band electrons. The binding energy difference of these two peaks is around 5.53 eV, corresponding to Mn$_2$O$_3$ (Mn$^{3+}$) state, which is consistent with more Mn being oxidized after air annealing.

Grazing Incidence X-ray Diffraction (GIXRD) characterization (not shown here) indicated that diffraction peaks for the 2:1, 4:1, 8:1, and 16:1 (Ti,Mn)O$_x$ films were attributed to rutile TiO$_2$ and Mn$_2$O$_3$ phases. In (Ti,Mn)O$_x$ films, peaks corresponding to rutile TiO$_2$ (110) plane (2θ=27.7°) broadened slightly, and peaks corresponding to Mn$_2$O$_3$ (222) plane (2θ=32.9°) appeared and became sharper with the increasing Mn compositions. It is hypothesized that less disordered crystalline phases result in a sharper XRD peak for Ti$^{3+}$ defect states. This sharper peak for the higher Mn compositions is correlated with the increased full-width half maximum of signals from the x-ray photoelectron spectroscopy of Mn3d intermediate bands, as indicated in Table 1. This observation is consistent with the theory calculations of the Ti$^{3+}$ intermediate bands in amorphous TiO$_2$ (Pham, H. H. & Wang, L.-W. Oxygen vacancy and hole conduction in amorphous TiO$_2$. *Phys Chem Chem Phys* 17, 541-550 (2015)).

Electrochemical Performance of (Ti,Mn)Ox Film Surfaces

Figure 2A:
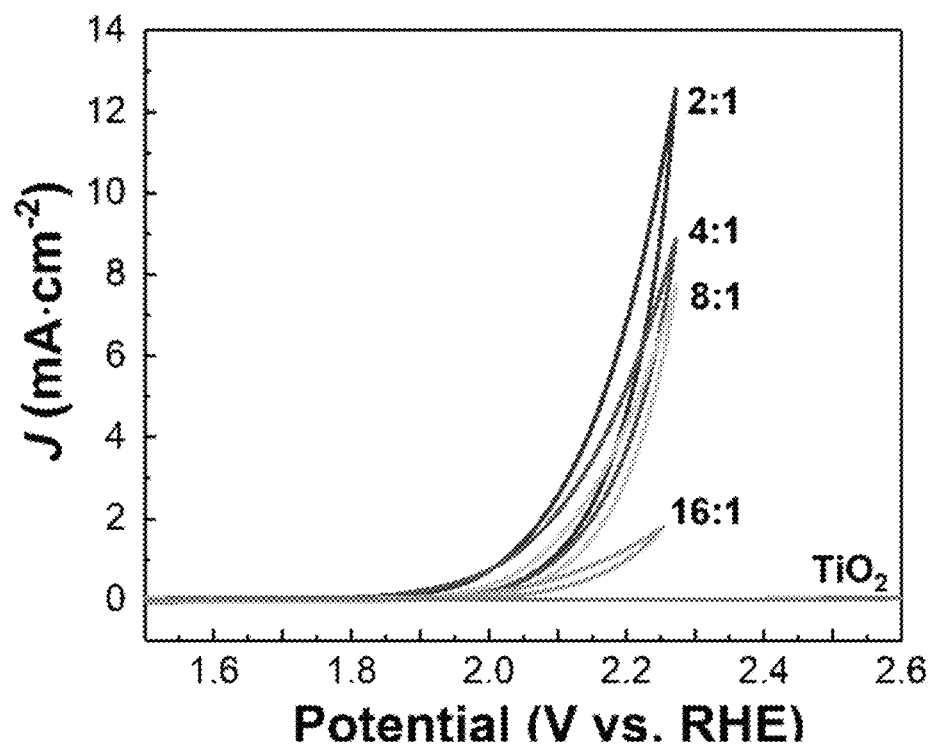
FIG. 2A shows the J-E curves of 2:1, 4:1, 8:1 and 16:1 $(Ti,Mn)O_x$ and pure $TiO_2$ thin films in 0.5 M pH=7 phosphate buffer. The y-axis is J (mA·cm$^{-2}$) and the x-axis potential (voltage vs. RHE). The scan rate was 20 mV·s$^{-1}$.

Investigations showed that Mn alloying affected the catalytic activity of the 2:1, 4:1, 8:1, and 16:1 (Ti,Mn)O$_x$ thin films for selective water oxidation in a pH=7 phosphate buffer solution. As shown in FIG. 2A, the catalytic activity showed obvious enhancement via Mn alloying. J-E curves of 2:1, 4:1, and 8:1 (Ti:Mn)O$_x$ films showed comparable anodic polarization behaviors, and were all more active than 16:1 and much more active than as-grown ALD TiO$_2$ (which is not observable in FIG. 1A). The J-E curves for each sample in pH=3 and pH=9 phosphate buffer solutions (not shown) showed a similar trend with those measured in the pH=7 phosphate buffer electrolyte.

Figure 2B:
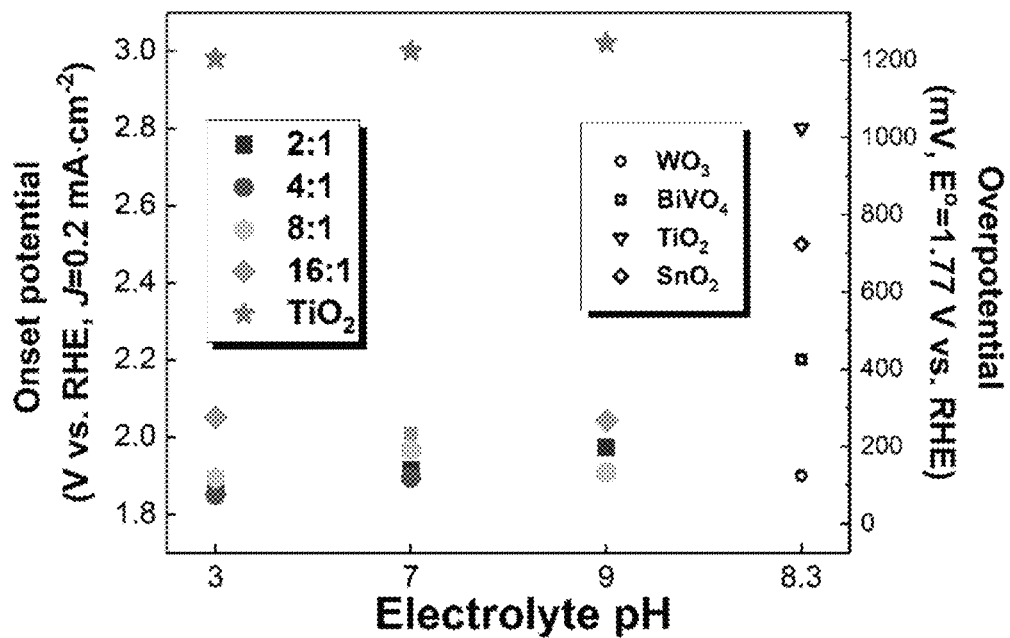
FIG. 2B shows the onset potential (left y-axis) and overpotentials (right y-axis) for hydrogen peroxide production of $(Ti,Mn)O_x$ films, as compared to data for $WO_3$, $BiVO_4$, $TiO_2$ and $SnO_2$, at J=0.2 mA·cm$^{-2}$. The scan rate was 20 mV·s$^{-1}$.

FIG. 2B shows a comparison of the onset potential (at J=0.2 mA·cm$^{-2}$) of the (Ti,Mn)O$_x$ electrocatalysts and other reported WO$_3$, BiVO$_4$, TiO$_2$ and SnO$_2$ materials (Shi, X. et al. Understanding activity trends in electrochemical water oxidation to form hydrogen peroxide. *Nat Commun* 8, 701 (2017)). The onset potential of the 4:1 film was 1.87 V$_{RHE}$, similar to those of the 2:1 and 8:1 films, and the onset potential of 16:1 films (2.05 $V_{RHE}$) was higher than all the other Mn compositions. The onset potentials of 2:1, 4:1, and 8:1 (Ti:Mn)$O_x$ films were consistently lower than the best reported catalysts, including BiVO$_4$ (2.20 $V_{RHE}$) (Shi, X. et al. Understanding activity trends in electrochemical water oxidation to form hydrogen peroxide. *Nat Commun* 8, 701 (2017)) and are similar to WO$_3$ (1.90 $V_{RHE}$) as the electrode. But WO$_3$ was reported to be unstable under surface hydrogen peroxide absorption, which might lead to low efficiency in the long term.

Electrochemical impedance spectroscopy (EIS) indicated the improvement of electron-transport conductivity of TiO$_2$ films after alloying with Mn.

Figure 2C:
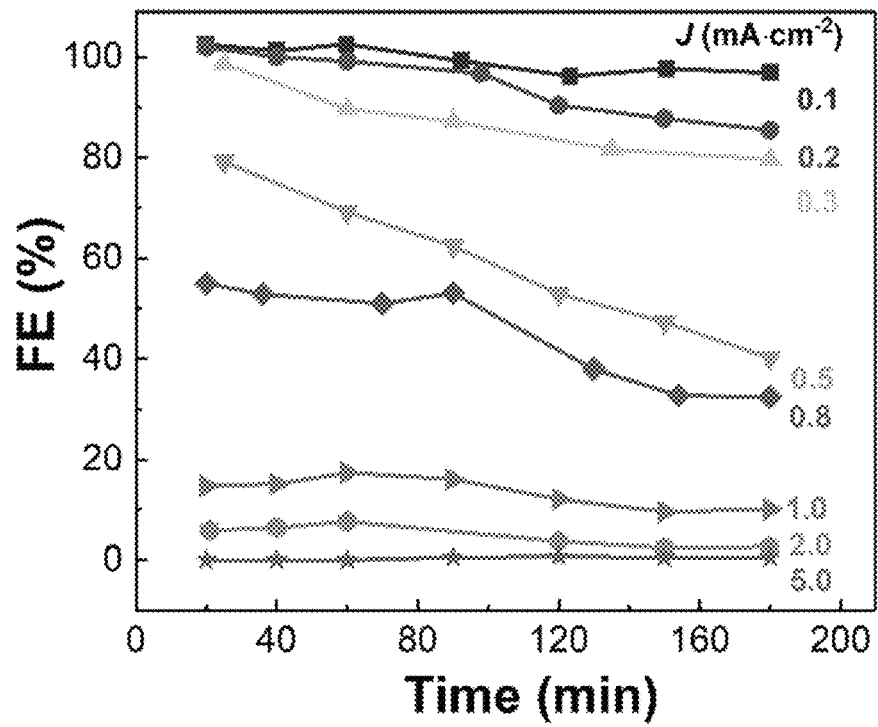
FIG. 2C shows a graph of percent Faradaic efficiency (FE) (y-axis) vs. reaction time (x-axis, minutes) at various current densities using a 4:1 $(Ti,Mn)O_x$ film as the catalyst.

Faradaic efficiency (FE) for hydrogen peroxide production with the (Ti,Mn)$O_x$ films was quantified as a function of the electrolysis time and applied bias. As shown in FIG. 2C, the FE as a function of different current densities, from 0.1 to 5 mA·cm$^{-1}$, were recorded under different electrolysis times (20 to 180 min). Normally for hydrogen evolution and oxygen evolution, FE is independent to the applied overpotentials. For CO$_2$ reduction, the product distribution is usually dependent on electrocatalyst overpotentials. FE was found to decrease as the current density increased, due to the increasing rates of the competing OH. formation according to the following reaction:

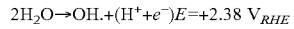

$$2H_2O \rightarrow OH. + (H^+ + e^-) \quad E = +2.38\ V_{RHE}$$

and eventual O$_2$ evolution reaction according to the following reaction:

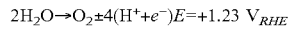

$$2H_2O \rightarrow O_2 \pm 4(H^+ + e^-) \quad E = +1.23\ V_{RHE}$$

Figure 2D:
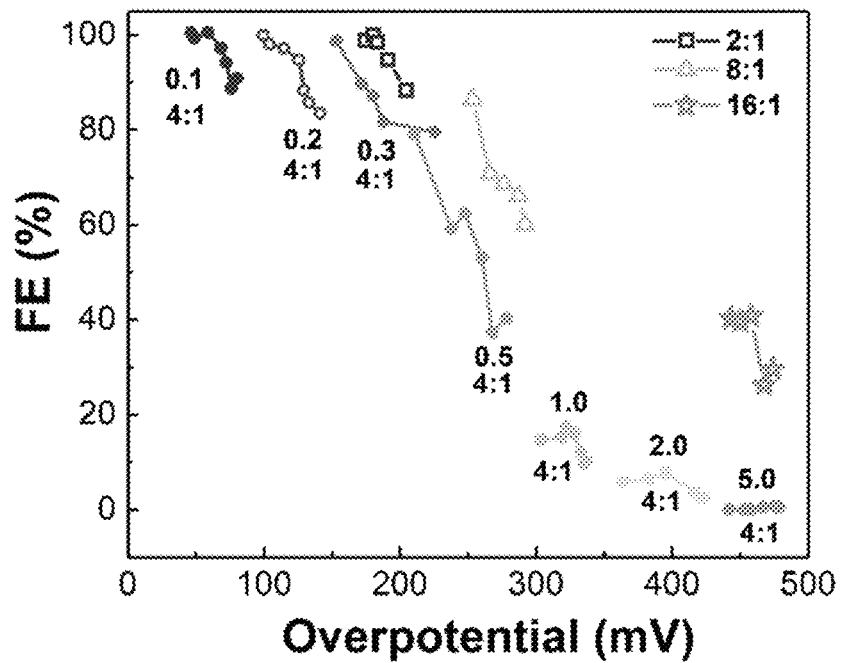
FIG. 2D shows a graph of percentage of Faradaic efficiency (FE) (y-axis) vs. overpotential (x-axis, mV) using a 4:1 $(Ti,Mn)O_x$ film as the catalyst at various current densities of 0.1, 0.2, 0.3, 0.5, 1.0, 2.0, and 5.0 mA·cm$^{-2}$. The FE for 2:1, 8:1, and 16:1 $(Ti,Mn)O_x$ films at J=0.2 mA·cm$^{-2}$ are also shown.

Those two reactions are the other side reactions competing with selective water oxidation to peroxide. The FE versus corresponding overpotentials (from 10 to 500 mV) are shown in FIG. 2D. Approximately 100% of FE can be obtained at low overpotentials of <100 mV or at equivalent current densities of <0.1 mA·cm$^{-2}$, which is consistently higher than FE values in recent reports (Shi, X. et al. *Nat Commun* 8, 701 (2017); Ki, et al. *Environmental Science & Technology* 51, 6139-6145, (2017); Shi, et al. *Adv Energy Mater,* 1801158 (2018); Izgorodin, et al. *Energ Environ Sci* 5, 9496-9501 (2012); and Fuku, K.; Miyase, Y.; Miseki, Y.; Gunji, T.; Sayama, K., WO3/BiVO4 photoanode coated with mesoporous Al2O3 layer for oxidative production of hydrogen peroxide from water with high selectivity. *RSC Advances* 2017, 7 (75), 47619-47623 WO3/BiVO4 photoanode coated with mesoporous Al$_2$O$_3$ layer for oxidative production of hydrogen peroxide from water with high selectivity. *Rsc Adv* 7, (2017)). However, when J was increased to 5 mA·cm$^{-2}$ with the corresponding overpotential of 450 mV, the FE dropped dramatically to less than 1%. The low FE at high overpotentials is due to the evolvement of other charge-transfer pathway on the TiO$_2$ surface, such as not forming hydroxyl radicals instead of forming —O—O— peroxyl bonds or breaking existing —O—O— bonds; both scenarios lead to O$_2$ evolution.

Furthermore, the FEs of 2:1, 8:1 and 16:1 (Ti,Mn)$O_x$ films at J=0.2 mA·cm$^{-2}$ were compared to the FEs of 4:1 films, as shown in FIG. 2D. The FE reached approximately a maximum value of 92.40%, 96.77%, 86.38%, and 40.32% for 2:1, 4:1, 8:1, and 16:1, respectively, showing that the 4:1 (Ti,Mn)$O_x$ film afforded the highest selectivity. Among the four compositions, only 16:1 gave a lower FE than the rest of compositions. The compositions higher than that are considered to give the same, high selectivity for water oxidation to hydrogen peroxide. In addition, compared with previously reported catalysts, such as Mn$_2$O$_3$, TiO$_2$, WO$_3$ and BiVO$_4$, the (Ti,Mn)$O_x$ studied showed higher selectivity at lower overpotentials.

H$_2$O$_2$ Accumulation

Figure 3:
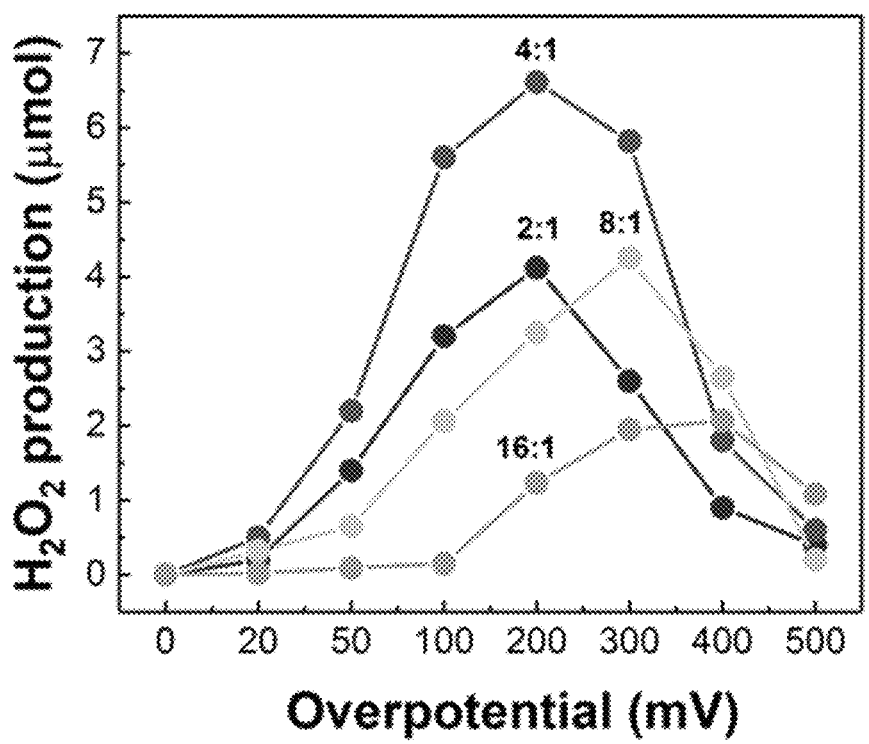
FIG. 3 shows a graph of hydrogen peroxide production accumulation (μmol; y-axis) of different $(Ti,Mn)O_x$ film ratios overpotentials ranging between 20 to 500 mV (x-axis) for 90 min.

H$_2$O$_2$ accumulation was further investigated for over 90 minutes and the quantification of accumulated amounts of H$_2$O$_2$ was conducted for all compositions of the (Ti,Mn)$O_x$ films in 0.5 M pH=7 phosphate buffer solutions under fixed 20, 50, 100, 200, and 500 mV overpotentials, as shown in FIG. 3. All ratios of the investigated (Ti,Mn)$O_x$ showed similar Faradaic Efficiency (FE) trend with an increasing applied bias: the H$_2$O$_2$ accumulation first increased to a maximum value for each overpotential and then decreased. Among all the ratios of (Ti,Mn)$O_x$, 4:1 achieved the highest molar quantity of 6 μmol H$_2$O$_2$ at 200 mV overpotential for 90 minutes.

Figure 4:
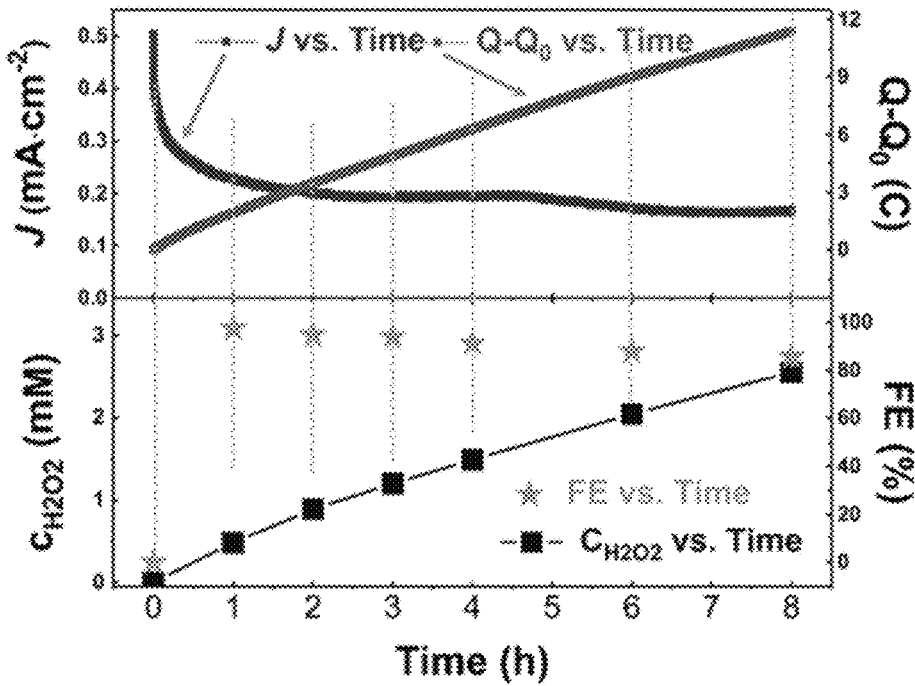
FIG. 4 shows a graph where the top portion shows current density J in mA·cm$^{-2}$ (left y-axis) and charge passed through the anode, i.e., Q-Q$_0$, in C (right y-axis) each vs. time in hours (x-axis). The bottom portion of the graph shows hydrogen peroxide accumulation concentration in mM (left y-axis) and percent Faradaic efficiency (FE) (right y-axis) each vs. time in hours (x-axis). The electrode area was 1.2 cm², the applied potential was 1.31 V vs. Ag/AgCl (equivalent with an overpotential of 150 mV) in a 20 mL 0.5 M pH=7.0 PB solution.

In order to accumulate additional H$_2$O$_2$, 8 hours of chronoamperometry measurements on the 4:1 (Ti,Mn)$O_x$ film with the area of 1.2 cm$^2$ in 20 mL aqueous pH=7 phosphate buffer solution was performed. As shown in the top portion of FIG. 4, J was initially measured to be around 0.5 mA·cm$^{-2}$ but gradually dropped to 0.2 mA·cm$^{-2}$ within the first two hours and remained at that current density level for the duration of the accumulation experiment. This is because the initial current is non-faradaic due to capacitive or pseudocapacitive charging, or may be because the catalytic intermediates or products adsorb and cover the catalytic surface. The average FE was higher than 91.3% within the first 4 hours, then gradually decreased but remained above 85.8% after 8 hours, as shown in FIG. 4. Simultaneously, the generated H$_2$O$_2$ reached a high concentration of 2.55 mM, as shown in the bottom portion of FIG. 4 and detailed in Table 2 below:

TABLE 2

Summary of current density (J, mA · cm$^{-2}$) and quantity (Q-Q$_0$, C) vs. time (h), and the titration result of corresponding H$_2$O$_2$ molar quantity and Faradaic efficiency (FE) for a 4:1(Ti, Mn)$O_x$ thin film (the electrode area was 1.2 cm$^2$) was used as an electrode in 20 mL, 0.5M, pH = 7 phosphate buffer electrolyte, the counter electrode was Ti foil

| time (h) | Current density (J, mA · cm$^{-2}$) | Charge (C) | Titration KMnO$_4$ (mL) | $n_{H2O2}$ in 20 mL (μmol) | $c_{H2O2}$ (mmol · L$^{-1}$) | $n^\theta(H_2O_2)$ (μmol) | FE (%) |
|---|---|---|---|---|---|---|---|
| 1 | 0.24 | 1.9 | 0.048 | 9.6 | 0.49 | 9.85 | 97.50 |
| 2 | 0.19 | 3.63 | 0.089 | 17.8 | 0.94 | 18.79 | 91.68 |
| 3 | 0.20 | 4.93 | 0.12 | 24 | 1.28 | 25.55 | 91.75 |
| 4 | 0.20 | 6.3 | 0.149 | 29.8 | 1.63 | 32.65 | 81.70 |
| 6 | 0.17 | 8.94 | 0.204 | 40.8 | 2.32 | 46.33 | 80.40 |
| 8 | 0.16 | 11.47 | 0.255 | 51.0 | 2.97 | 59.44 | 77.80 |

Discussion

Differences between the electrochemically active (Ti,Mn)$O_x$ and inactive "leaky" TiO$_2$ when poised under anodic potentials can be explained by an electron tunneling mechanism in conjunction with the unique interfacial electronic structure of oxide electrocatalysts, as illustrated using FIGS. 5A and 5B. The anodic potential of +1.8 $V_{RHE}$ allows for the formation of surface-bound hydroxyl intermediates, which is a thermodynamically spontaneous potential for hydrogen peroxide formation. When the electrode was poised anodically at this potential or above, its electron Fermi level lay below the formal potential of H$_2$O$_2$/H$_2$O couples, i.e. E(H$_2$O$_2$/H$_2$O). Conventionally, the difference between the electrode poised potential and the redox formal potential is dropped across the electrochemical double layer at the electrolyte side. For an n-type oxide semiconductor with an electrocatalytic surface, a band bending region will be induced at the material's side of the electrocatalyst bulk so that the potential difference is dropped across the band bending region. Here the band bending in oxides is due to the oxygen vacancies' positive fixed space charge. At the boundary between a solid-state catalyst (whether a semiconductor or a metal) and the liquid electrolyte, the density of states at each phase determines the profile of potential drop across the boundary. The density of states of fixed charge in semiconductors, e.g. the oxygen vacancy concentration in ALD-grown $TiO_2$ or $(Ti,Mn)O_x$, are on the order of $10^{16}$-$10^{18}$ $cm^{-3}$, whereas the density states for metals and electrolytes are $10^{21}$-$10^{23}$ $cm^{-3}$ (Paracchino, A. et al. *Energ Environ Sci* 5, 8673-8681 (2012); Lichterman, M. F. et al. *Energ Environ Sci* 8, 2409-2416 (2015; Lichterman, et al. *Journal of Electron Spectroscopy and Related Phenomena* 221, 99-105 (2017); and Nozik, A. J. & Memming, R. *The Journal of Physical Chemistry* 100, 13061-13078 (1996)). The electron acceptor levels in "leaky" $TiO_2$ originate from the native $Ti^{3+}$ defects, whereas the acceptor level in $(Ti,Mn)O_x$ originated from the $Mn^{3+}$ intermediate band (IB). Both acceptor levels are not shallow, which means they are not close to either conduction or valence bands, thus only trapping electrons and bringing the $E_F$ to mid-gap but not doping the oxides p-type. The poised +1.8 $V_{RHE}$ created a band bending potential profile, which dropped mainly in the $TiO_2$ or $(Ti,Mn)O_x$ phase because its fixed positive charge density of states are orders of magnitude lower than that of the phosphate buffer, and the Mn impurities are considered charge neutral.

For "leaky" $TiO_2$ with a $Ti^{3+}$ defect band, the mobile charge carriers are energetically trapped electrons in the $Ti^{3+}$-defect band. After the mobile electrons were depleted, oxygen vacancies in the amorphous oxide create a fixed positive charge and upward band bending. In the $TiO_2$ bulk away from the interface, the poised potential of +1.8 $V_{RHE}$ (as an example) shifts the Fermi level, $E_F$, from +0.94 $V_{RHE}$ at flat band to a nearly constant value of +1.8 $V_{RHE}$ (only constant at zero current flow), meaning in the bulk all the bands including the intermediate bands should shift together with the Fermi level. Near the liquid interface, all the band including intermediate bands followed the band bending. As the applied bias partially deplete the $TiO_2$'s surface states, the band edge position with respect to redox potentials in the electrolyte moved by the same potential. This is a temporary band edge "unpinning", for a small range of potentials during the potential sweep, which lowers the band edge positions accordingly. After potential crosses the surface states, no states at the liquid interface can be further charged. Therefore, the band edge pinning re-appears as in the bulk continues to "deplete", resulting in a maximum +0.4 V downward shift for the $TiO_2$'s band edges positions. These phenomena had been experimentally verified (Lichterman, M. F. et al. Direct observation of the energetics at a semiconductor/liquid junction by operando X-ray photoelectron spectroscopy. *Energy Environ. Sci.* 8, 2409-2416, doi: 10.1039/C5EE01014D (2015); Favaro, M. et al. *Nat Commun* 7, 12695, (2016); and Shavorskiy, A. et al. *J Phys Chem Lett* 8, 5579-5586, (2017)) and the quantitative band edge shift used here illustrates the band edge positions of $(Ti,Mn)O_x$ electrocatalysts under applied potentials, because of its $TiO_2$-rich surface.

Therefore, independent of the applied anodic potentials, the energy levels of the CB, VBM, and the top edge of $Mn^{3+}$ IB are fixed at 0.00, 3.34 and 1.73 $V_{RHE}$ at the $TiO_2$-liquid surface, while the bottom edge of $Ti^{3+}$ IB in "leaky" $TiO_2$ is fixed at +1.2 $V_{RHE}$, above $E(H_2O_2/H_2O)$. Under the potentials of 1.6-2.3 $V_{RHE}$, the $Ti^{3+}$ IB were depleted, available to accept electrons for anodic charge transfer. However at the $TiO_2$-liquid interface, there remained a blank region (between +1.2 and +1.8 $V_{RHE}$) of no electronic states that were made available for anodic charge transfer from Ti—OH surface-intermediate states (+2.3 $V_{RHE}$ into the "leaky" $TiO_2$ surface at the respective energy level. Furthermore, charge tunneling should not be possible or even remotely effective for the range of energy levels near the Ti—OH states: the width of the no-state region is determined by the oxide's oxygen vacancy density, which is on the order of $10^{16}$-$10^{18}$ $cm^{-3}$, and is calculated to be much wider than a typical tunneling width of 1-2 nm. For the case of degenerately n-type doped blue $TiO_2$ nanotubes, the strong bending reduced the width of no electronic states to few nm, enabling charge tunneling to the $TiO_2$ VB. "Leaky" $TiO_2$ cannot make anodic charge transfer between $Ti^{3+}$ intermediate bands and Ti—OH states in dark.

The $(Ti,Mn)O_x$ intermediate-band electronic structure indicated that the $TiO_2$-rich electrocatalytic surface, with an underlying $Mn^{3+}$-impurity band located within the otherwise forbidden $TiO_2$ bandgap, can facilitate anodic charge injection to the redox states of surface intermediates in the dark. Similarly, the bulk of $(Ti,Mn)O_x$ contains a fixed positive charge which is compensated with free electrons for charge neutrality. When an anodic potential of +1.8 $V_{RHE}$ was applied, that is an positive overpotential to the $H_2O/H_2O_2$ redox couple, both the $Ti^{3+}$ defect band in the "leaky" $TiO_2$ bulk and the Mn-impurity band in the $(Ti:Mn)O_x$ bulk were depleted with freely mobile electrons but remain charge neutral. Because of the fixed positively-charged oxygen vacancies are like an n-type silicon, the upward "bending" (see FIG. 5B) of CB and VB band edges and intermediate bands of $(Ti,Mn)O_x$ occurs, and the band edges at the liquid interface are fixed under varying applied potentials. The alignment with the redox potentials was taken from the spectroscopically measured values for "leaky" $TiO_2$. Direct measurements for $(Ti,Mn)O_x$'s band edge positions as a function of applied potential can be determined according to a reported procedure (Lichterman, M. F. et al. *Energ Environ Sci* 8, 2409-2416 (2015)). Because of its $TiO_2$-rich surface, it is reasonable to consider $(Ti,Mn)O_x$'s band edges also "pinned" at the liquid interface.

Upon charge depletion, both intermediate bands became available to accept electrons for anodic charge transfer. It is reasonable to assume that the $Mn^{3+}$ intermediate band accepts and transports electrons freely at their respective defect levels, similar to "leaky" $TiO_2$ but at an energy range of 0.61-1.49 $V_{RHE}$ (Siddiqi, G. et al. *ACS Appl Mater Inter* 10, 18805-18815, (2018)). Therefore, as the applied potential lowered the Fermi level of the bulk electrocatalyst, the $Mn^{3+}$ IB near the electrode-electrolyte interface became partially filled instead of fully filled. The tunable intermediate bands of $(Ti,Mn)O_x$ enabled matching the energy of Ti—OH with the charge transfer Mn-impurity states under the positive potential applied. In conjunction with its band bending and band edge pinning, $(Ti,Mn)O_x$ allowed for anodic Faradaic charge exchange with Ti—OH intermediates. In other words, $(Ti,Mn)O_x$ exhibited anodic activity for water oxidation even in dark.

With the semiconductor-like energetics of the $(Ti,Mn)O_x$-liquid and $TiO_2$-liquid interfaces established, the tunable positions of intermediate bands suggested $(Ti,Mn)O_x$'s emergent capability to choose the specific charge-injection potentials that are pertinent toward selective hydrogen peroxide generation. In the water oxidation process, water can be oxidized electrochemically to form OH., $H_2O_2$, and/or $O_2$ via one, two, and four electron processes, respectively, but at different charge-injection potentials, as shown in the following reactions, respectively:

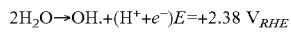

$$2H_2O \rightarrow OH. + (H^+ + e^-) \quad E = +2.38\ V_{RHE}$$

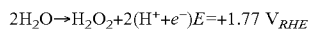

$$2H_2O \rightarrow H_2O_2 + 2(H^+ + e^-) \quad E = +1.77\ V_{RHE}$$

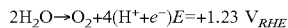

$$2H_2O \rightarrow O_2 + 4(H^+ + e^-) \quad E = +1.23\ V_{RHE}$$

The trends for water-oxidation kinetics are correlated with the relative binding energies of three key intermediates, O., OH., and OOH. (Rossmeisl, J., Qu, Z.-W., Zhu, H., Kroes, G.-J. & Nørskov, J. K. *J Electroanal Chem* 607, 83-89 (2007); and Man, I. C. et al. *ChemCatChem* 3, 1159-1165 (2011)). Nørskov and co-workers used the thermodynamic free energy of adsorbed OH. as a descriptor to determine activities in two-electron oxidation of $H_2O$ to produce $H_2O_2$ (Viswanathan, et al. *The Journal of Physical Chemistry Letters* 6, 4224-4228, doi:10.1021/acs.jpclett.5b02178 (2015)). The calculated free energy of adsorbed OH. of $TiO_2$ is ~2.14 eV, by following the density functional theory calculations.

Three steps for this $2e^-$ water oxidation process on $TiO_2$ surfaces are: (1) the dissociative adsorption of $H_2O$ to form adsorbed OH. species on the $TiO_2$ surface, (2) Since a lot OH. is adsorbed on the $TiO_2$ surface, the Ti—OH bond is generated at a certain applied potential (and overpotential is needing to drive the bond formation). (3) The surface sites are rapidly regenerated by desorbing the hydrogen peroxide molecules, leading to the free Ti sites becoming available to dissociate other water molecules.

The kinetics rate determining those intermediates determine selectivity and branching ratios of desirable pathways versus all other pathways showing a lower potential for hydrogen peroxide. For leaky" $TiO_2$, the $Ti^{3+}$ defect band missed all the potential ranges of key intermediates for any water oxidation pathway to occur on $TiO_2$ surfaces, and charge tunneling was not possible. Hence, it is difficult to generate $H_2O_2$, $O_2$, or even OH. radicals on the "leaky" $TiO_2$. For blue $TiO_2$ arrays and other traditional metal oxide photocatalysts such as $BiVO_4$ and $WO_3$, the charges inject to the VB instead of the carefully positioned intermediate bands. This charge injection, however, makes available all one, two, and four electron processes, thereby forfeiting selectivity toward peroxide (Hill, J. C. & Choi, K.-S *The Journal of Physical Chemistry C* 116, 7612-7620 (2012)).

For $(Ti,Mn)O_x$, the intermediate band (TB) functions as a charge-transfer stepping allowing for electron transformation and the tunable positions of IBs displayed the ability to choose the specific energies. Once the applied potential passes positively over the OH. formation energy (i.e. 2.37 $V_{RHE}$), it is favorable to form solvated OH. (aq), which then desorb as the catalytic sites recycle. For other water oxidation pathways, the kinetic barrier is too high despite the favorable thermodynamics for oxygen evolution with a high overpotential. Under such high overpotentials, $H_2O_2$ evolution should still occur, but the surface peroxyl bonds dissociate rapidly under the presence of OH. either formed on the surface or from the liquid electrolyte. There is only 0.13 V in potential energy between formation of Ti—OH bond (rate-determining steps in $H_2O_2$ generation according to FIG. 6) and formation of hydroxyl OH. radicals. The relevant binding energies shown in FIG. 6 are adapted from Siahrostami, S., et al. *The Journal of Physical Chemistry Letters* 8, 1157-1160, (2017). This small difference implies a sensitive potential range switching from $H_2O_2$ to OH. selectivity, which is consistent with the experimental results that a narrow potential range (overpotential should be ~50 to ~300 mV) displays high $H_2O_2$ selectivity.

The challenge for selective hydrogen peroxide generation is, as long as the potential of $H_2O_2$ is produced, $O_2$ is favorable thermodynamically to be produced because the $O_2$ evolution always operates at 0.55V more overpotential than hydrogen peroxide generation. This challenge is common to many conventional catalysts. Hence, the experimental data shown for $(Ti,Mn)O_x$ demonstrated two main principles to achieving peroxide selective catalysts achieved via kinetic control and charge-injection potential tuning. The data showed it was possible for the $(Ti,Mn)O_x$ catalysts disfavor kinetics for $O_2$ evolution reaction thereby providing an enhancement and selection for hydrogen peroxide generation to be faster than $O_2$ evolution. For the $(Ti,Mn)O_x$ catalysts studied, Mn impurities are found inside the $TiO_2$ matrix thereby leaving a $TiO_2$-rich surface. The second principle is to avoid active surfaces that easily react with hydrogen peroxide and decompose as-produced hydrogen peroxide immediately. For example, Mn is not favorable for hydrogen peroxide accumulation because $Mn^{2+}$ ions catalyze its decomposition. But this principle has been generally overlooked. Combining both principles, it has been demonstrated that introducing a tunable $Mn^{3+}$ IB additionally enables charge transfer to Ti—OH intermediates for hydrogen peroxide generation and that using a modest overpotential can allow avoidance of the undesirable OH. pathway. As a result, almost 100% $H_2O_2$ selectivity was achieved is owing to three specific unique properties: (1) after Mn alloyed with ALD method, although other methods such as sputtering are believed to work for the same purpose, the film showed enhanced anodic activity over the $TiO_2$-rich surface; (2) the defect band (intermediate band) is consistent with the energy level of $H_2O_2$ production intermediates; and (3) after equilibration, as a semiconductor, the band edge of the $(Ti,Mn)O_x$ catalysts is not changed, which means the electronic structure can be designed for different pathways through changing the flat band positions. These properties are applicable to other semiconducting catalysts made based on the above principles for achieving selective catalysis for hydrogen peroxide generation through a 2e– water oxidation process.

CONCLUSION $(Ti,Mn)O_x$ catalysts with enhanced selectivity of water oxidation to hydrogen peroxide, where Mn was alloyed with $TiO_2$ thin films, was studied experimentally and found to allow for almost 100% hydrogen peroxide selectivity in water oxidation process owing to the tunability of the charge transfer energy levels. The $(Ti,Mn)O_x$ thin films showed enhanced anodic polarizations, as well as tunable energies for the Fermi levels and IB positions. It is believed that the mechanism for anodic charge conduction across the (Ti,Mn)$O_x$ films is not only due to the achieved tunable Fermi level to valence band and IB positions, which enhances the electron conductivity, but also due to a partially filled IB that matches the electronic states for water oxidation reactions.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention. Such equivalents are intended to be encompassed by the following claims.

I claim:

1. A layered peroxide selective catalyst comprising:
   (1) at least a first layer on a substrate wherein the at least first layer comprises at least a first metal oxide alloyed or doped with at least one metal selected from the group consisting of manganese, chromium, vanadium, cobalt, oxides thereof, and combinations thereof; and
   (2) at least a second layer wherein the second layer comprises at least a second metal oxide which is optionally free or substantially free of the least one metal selected from the group consisting of manganese, chromium, vanadium, cobalt, nickel, oxides thereof, and combinations thereof.

2. The catalyst of claim 1, wherein the at least first and/or the at least second layers are formed by atomic layer deposition (ALD) and/or by sputtering.

3. The catalyst of claim 1, wherein the catalyst was annealed in air or under an inert atmosphere at a temperature ranging from between about 300 to 700° C. and for a period of time between about 0.1 and 3 hours.

4. The catalyst of claim 1, wherein the first or the second metal oxide is formed of a metal oxide selected from a titanium dioxide, a tin oxide, a tungsten oxide, or a combination thereof.

5. The catalyst of claim 1, wherein the at least one metal alloyed or doped in the first metal oxide is a metal oxide of manganese, chromium, vanadium, cobalt, or a combination thereof.

6. The catalyst of claim 1, wherein the second layer is free or substantially free of the least one metal selected from the group consisting of manganese, chromium, vanadium, and cobalt.

7. The catalyst of claim 6, wherein the second layer is free of the least one metal selected from the group consisting of manganese, chromium, vanadium, and cobalt.

8. The catalyst of claim 1, wherein the atomic percentage of the at least one metal doped or alloyed in the at least first metal oxide is between about 1 and 75% of the first layer alone or in combination with the second layer.

9. The catalyst of claim 1, wherein the metal oxide of the first layer is alloyed or doped with at least one metal selected from the group consisting of manganese, chromium, vanadium, cobalt, and can be defined according to Formula (1) or Formula (2):

$$M^1[(M^2_y)O_x] \quad (1)$$

$$M^1[(M^2)O_x]_y \quad (2)$$

where $M^1$ is selected from the group consisting of manganese, chromium, vanadium, cobalt, and combinations thereof; $M^2$ is selected from the group consisting of titanium, tin, tungsten, and combinations thereof; and y is a composition value which is a >0 real number from 0-3, and x is a composition value which is a >0 real number from 0-3.

10. The catalyst of claim 1, wherein the substrate is a conductive substrate, a photocatalytic substrate, or a combination thereof.

11. A device comprising the catalyst of claim 1.

12. The device of claim 11, wherein the device is an electrolyzer.

13. The device of claim 12, wherein the electrolyzer is a membrane-less electrolyzer.

14. A method of oxidizing water to selectively form hydrogen peroxide, the method comprising contacting the catalyst of claim 1 with water or an aqueous solution; and
applying an effective amount of a stimulus sufficient to drive oxidation of the water or to drive oxidation of the water in the aqueous solution to form hydrogen peroxide as the only or substantially the only product of the oxidation of the water.

15. The method of claim 14, wherein the stimulus is an electrochemical potential or electromagnetic radiation.

16. A method of forming a layered peroxide selective catalyst comprising the steps of:
   (1) depositing at least a first layer on a substrate by atomic layer deposition and/or by sputtering at a predetermined deposition temperature, wherein the at least first layer comprises at least a first metal oxide alloyed or doped with at least one metal selected from the group consisting of manganese, chromium, vanadium, cobalt, oxides thereof, and combinations thereof;
   (2) depositing at least a second layer by atomic layer deposition and/or by sputtering at a predetermined temperature on the at least first layer; wherein the second layer comprises at least a second metal oxide which is optionally free or substantially free of the least one metal selected from the group consisting of manganese, chromium, vanadium, cobalt, oxides thereof, and combinations thereof;
   wherein steps (1) and (2) are optionally repeated one or more times prior to annealing; and
   (3) annealing the resulting layered peroxide selective catalyst.

17. The method of claim 16, wherein the annealing step is carried out in air or under an inert atmosphere at a temperature between about 300 and 700° C. and for a period of time ranging from between about 0.1 to 3 hours.

18. The method of claim 16, wherein the first or the second metal oxide is formed of a metal oxide selected from a titanium dioxide, a tin oxide, a tungsten oxide, or a combination thereof.

19. The method of claim 16, wherein the at least one metal alloyed or doped in the first metal oxide is a metal oxide of manganese, chromium, vanadium, cobalt, nickel or a combination thereof.

20. The method of claim 16, wherein the second layer is free or substantially free of the least one metal selected from the group consisting of manganese, chromium, vanadium, and cobalt.

21. The method of claim 20, wherein the second layer is free of the least one metal selected from the group consisting of manganese, chromium, vanadium, cobalt, and nickel.

22. The method of claim 16, wherein the atomic percentage of the at least one metal doped or alloyed in the at least first metal oxide is between about 1 and 75% of the first layer alone or in combination with the second layer.

23. The method of claim 16, wherein the metal oxide of the first layer is alloyed or doped with at least one metal selected from the group consisting of manganese, chromium, vanadium, cobalt, and can be defined according to Formula (1) or Formula (2):

$$M^1[(M^2_y)O_x] \quad (1)$$

$$M^1[(M^2)O_x]_y \quad (2)$$

where $M^1$ is selected from the group consisting of manganese, chromium, vanadium, cobalt, and combinations thereof; $M^2$ is selected from the group consisting of titanium, tin, tungsten, and combinations thereof; and y is a composition value which is a >0 real number from 0-3, and x is a composition value which is a >0 real number from 0-3.

24. The method of claim 16, wherein the substrate is a conductive substrate, a photocatalytic substrate, or a combination thereof.

25. The method of claim 16, wherein the atomic layer deposition in steps (1) and/or (2) are carried out using a metal-containing precursor containing of titanium, tin, or tungsten.

* * * * *